(12) United States Patent
Steelman et al.

(10) Patent No.: US 9,433,282 B2
(45) Date of Patent: Sep. 6, 2016

(54) CONNECTOR HUB AND MODULAR WORK SYSTEM

(71) Applicant: HNI Technologies Inc., Muscatine, IA (US)

(72) Inventors: Derek Steelman, Muscatine, IA (US); Daniel Birr, Fall River, WI (US); Kelly Bazal, Wilton, IA (US); Paul Trieu, Iowa City, IA (US); Mitchell R. Bakker, Holland, MI (US); Zachary Raven, Grand Rapids, MI (US); Cara Danis, Kalamazoo, MI (US); Evan Aschbrenner, Muscatine, IA (US); Karl Youngdahl, Muscatine, IA (US)

( * ) Notice: Subject to any disclaimer, the term of this patent is extended or adjusted under 35 U.S.C. 154(b) by 0 days.

(21) Appl. No.: 14/491,630

(22) Filed: Sep. 19, 2014

(65) Prior Publication Data

US 2015/0083870 A1 Mar. 26, 2015

Related U.S. Application Data

(60) Provisional application No. 61/882,399, filed on Sep. 25, 2013.

(51) Int. Cl.
| | |
|---|---|
| *A47B 13/00* | (2006.01) |
| *A47B 13/02* | (2006.01) |
| *F16B 12/44* | (2006.01) |
| *A47B 21/06* | (2006.01) |

(52) U.S. Cl.
CPC .............. *A47B 13/02* (2013.01); *F16B 12/44* (2013.01); *A47B 2021/066* (2013.01); *A47B 2200/0017* (2013.01); *Y10T 29/49826* (2015.01); *Y10T 403/55* (2015.01)

(58) Field of Classification Search
CPC ............ A47B 13/02; A47B 2021/066; A47B 2200/0017; F16B 12/44; Y10T 403/55
USPC ......... 52/36.1, 36.4, 36.5, 220.1, 36.2, 36.6, 52/40, 239, 300; 174/60, 500, 481, 68.1, 174/48, 49, FOR. 107, FOR. 108, FOR. 115; 312/223.1, 223.3, 223.6; 248/126
See application file for complete search history.

(56) References Cited

U.S. PATENT DOCUMENTS

| | | | | |
|---|---|---|---|---|
| 3,565,152 A | * | 2/1971 | Cohn, Jr. ................. | A47G 5/00 160/135 |
| 3,685,664 A | * | 8/1972 | Kramer ..................... | A47F 5/04 108/106 |
| 3,987,836 A | * | 10/1976 | LeMay ................ | E04B 2/7438 160/135 |
| 4,252,989 A | | 2/1981 | Blumenthal | |
| 4,354,330 A | | 10/1982 | Schwartz | |
| 5,031,371 A | * | 7/1991 | Davister .................. | E04B 1/10 403/170 |

(Continued)

FOREIGN PATENT DOCUMENTS

| | | | | |
|---|---|---|---|---|
| AU | WO 9724951 A1 | * | 7/1997 | .......... A47B 3/0917 |
| DE | 19606193 A1 | * | 8/1997 | ............. A47B 21/06 |
| FR | 2637657 A1 | * | 4/1990 | ............. A47B 13/02 |

*Primary Examiner* — Robert Canfield
*Assistant Examiner* — Babajide Demuren
(74) *Attorney, Agent, or Firm* — Faegre Baker Daniels LLP

(57) ABSTRACT

A connector hub assembly usable as a standalone module or as a component in a work space system. The connector hub assembly optionally includes features for connecting one or more arms of a support frame for supporting a modular workspace system including desk space, cabinet space, view screens, electronic equipment, and/or other workspace system components.

21 Claims, 34 Drawing Sheets

(56) References Cited

U.S. PATENT DOCUMENTS

| | | | |
|---|---|---|---|
| 5,044,135 A * | 9/1991 | Kroon | A47B 83/001 108/60 |
| 5,144,780 A * | 9/1992 | Gieling | E04B 1/5831 135/114 |
| 5,144,896 A | 9/1992 | Fortsch | |
| 5,160,188 A * | 11/1992 | Rorke | A47B 21/06 312/196 |
| 5,220,871 A | 6/1993 | Grund et al. | |
| 5,226,705 A * | 7/1993 | Rorke | A47B 21/06 108/50.02 |
| 5,318,259 A * | 6/1994 | Fussler | A47B 21/06 108/50.02 |
| 5,354,658 A | 10/1994 | Wright | |
| 5,357,055 A | 10/1994 | Sireci | |
| 5,606,919 A | 3/1997 | Fox et al. | |
| 5,673,632 A | 10/1997 | Sykes | |
| 5,684,469 A | 11/1997 | Toms et al. | |
| 5,746,334 A | 5/1998 | Brandenberg | |
| 5,833,332 A | 11/1998 | Marshall et al. | |
| 5,886,295 A | 3/1999 | Carino et al. | |
| 5,906,284 A | 5/1999 | Hammerstrom et al. | |
| 5,933,563 A | 8/1999 | Schaffer et al. | |
| 5,942,984 A | 8/1999 | Toms et al. | |
| 5,964,237 A * | 10/1999 | Lin | A45B 19/08 135/114 |
| 5,971,509 A | 10/1999 | Deimen et al. | |
| 6,086,028 A | 7/2000 | Pfister | |
| 6,220,186 B1 | 4/2001 | Scharer et al. | |
| 6,359,217 B1 | 3/2002 | Thompson et al. | |
| 6,364,678 B1 | 4/2002 | Hellwig et al. | |
| 6,419,511 B2 | 7/2002 | Lizell | |
| 6,449,909 B1 | 9/2002 | Baloga et al. | |
| 6,460,470 B1 | 10/2002 | Scharer et al. | |
| 6,484,647 B2 | 11/2002 | Lininger, Jr. et al. | |
| 6,553,730 B1 * | 4/2003 | Mueller | E04B 2/7433 439/654 |
| 6,712,433 B2 | 3/2004 | Hellwig et al. | |
| 6,725,784 B2 | 4/2004 | Crinion | |
| 6,759,589 B1 * | 7/2004 | VanderVelde | A47B 21/06 174/481 |
| 6,817,684 B2 | 11/2004 | Cattaneo | |
| 6,848,369 B1 | 2/2005 | King et al. | |
| 6,953,355 B1 | 10/2005 | Lizell | |
| 7,178,765 B2 * | 2/2007 | Huang | A47B 21/00 248/122.1 |
| 7,278,360 B2 | 10/2007 | Griepentrog | |
| 7,357,086 B2 | 4/2008 | Petrick et al. | |
| 7,626,120 B1 * | 12/2009 | Golden | H02G 3/185 174/135 |
| 7,677,182 B2 | 3/2010 | Mueller et al. | |
| 7,712,847 B1 | 5/2010 | Albright et al. | |
| 7,827,920 B2 | 11/2010 | Beck et al. | |
| 7,893,567 B1 | 2/2011 | Oga | |
| 8,402,900 B2 | 3/2013 | Burak et al. | |
| 8,689,705 B2 | 4/2014 | Martin et al. | |
| 2002/0046852 A1 * | 4/2002 | King | A47B 21/06 174/500 |
| 2005/0000168 A1 * | 1/2005 | Wright | E04B 2/7427 52/36.1 |
| 2006/0278777 A1 * | 12/2006 | Atkinson | A47B 13/021 248/188.4 |
| 2007/0283630 A1 * | 12/2007 | Kasdorf | E04B 2/7435 52/36.1 |
| 2012/0103234 A1 | 5/2012 | Schiavello et al. | |

* cited by examiner

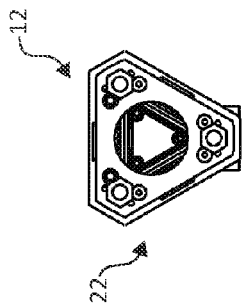
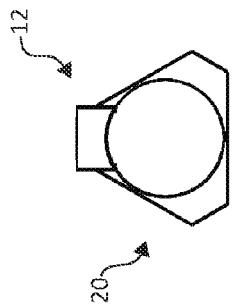
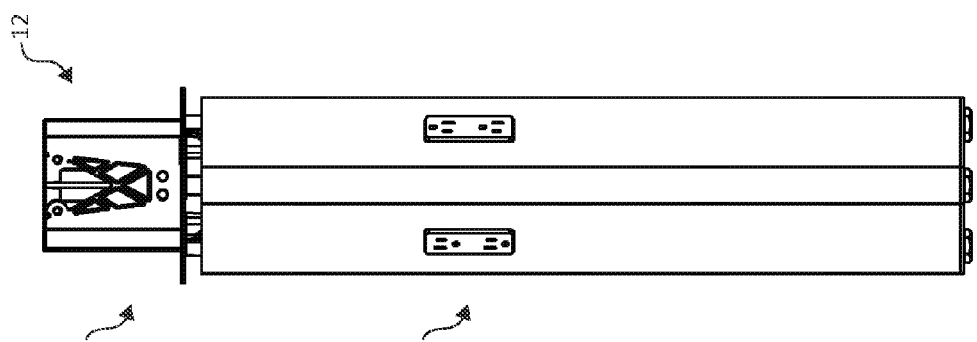
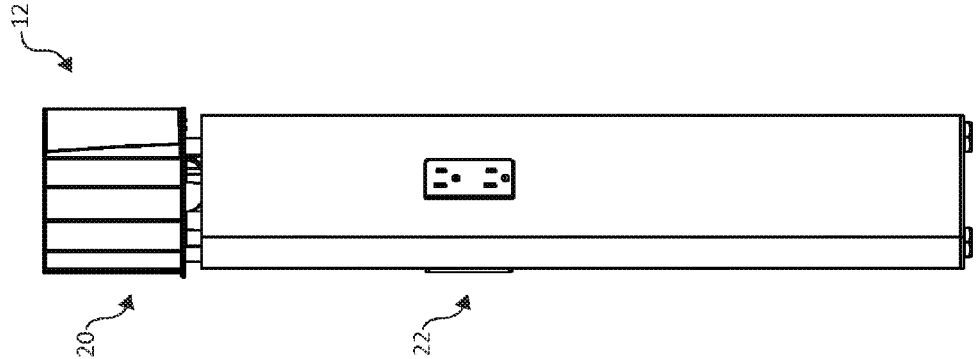
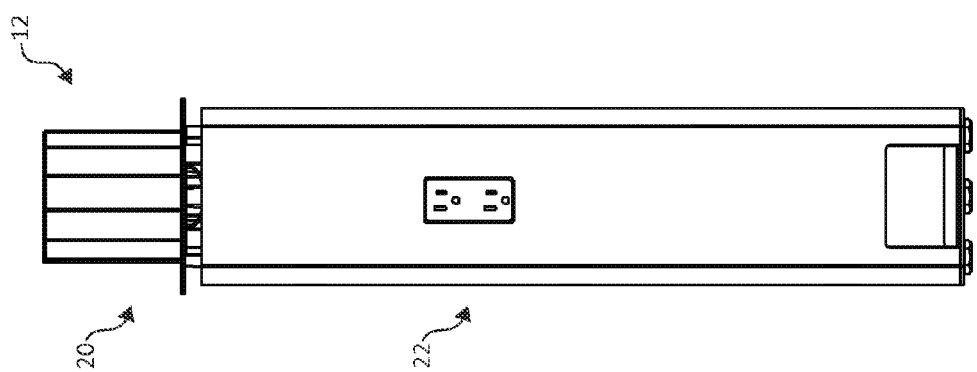

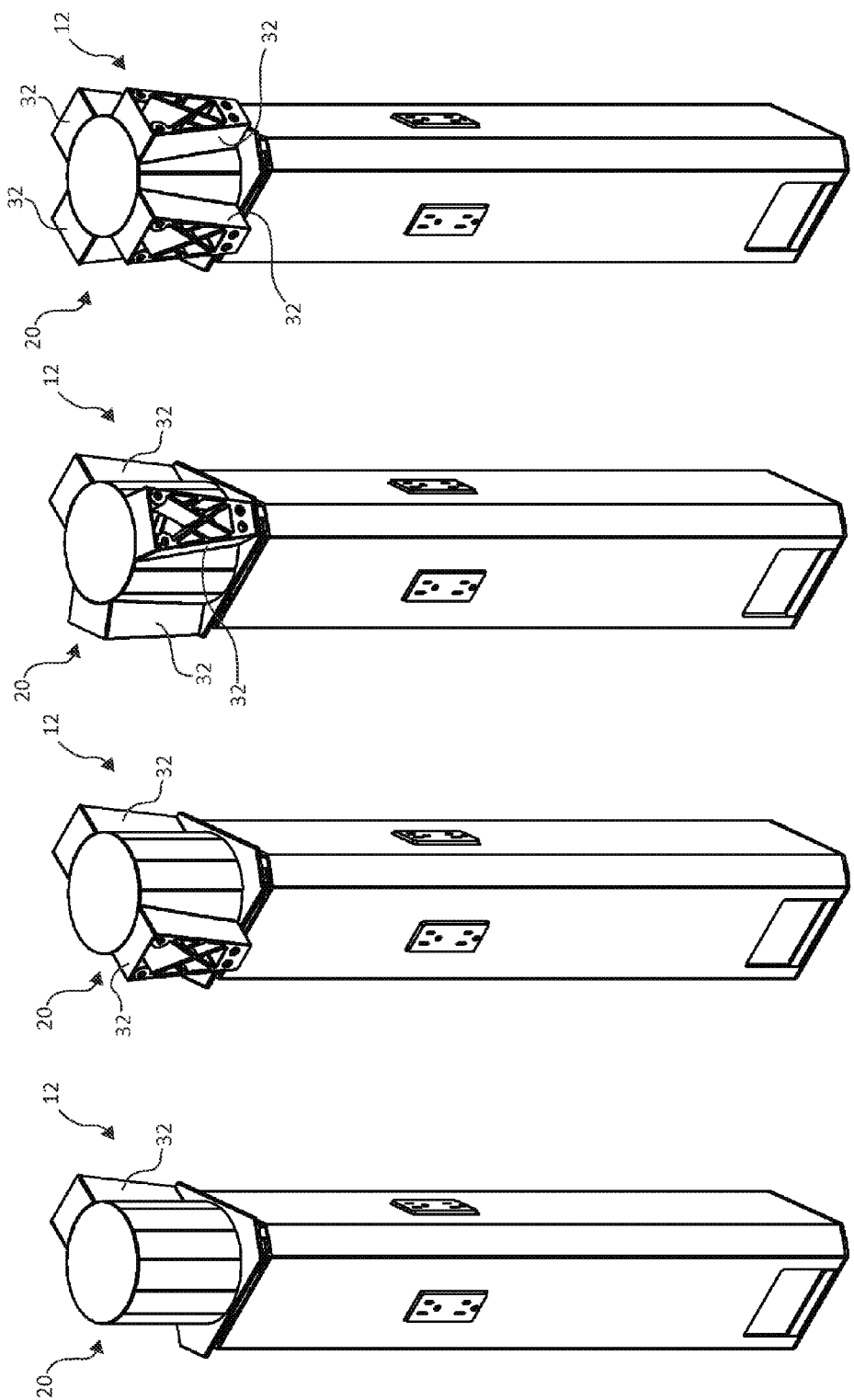

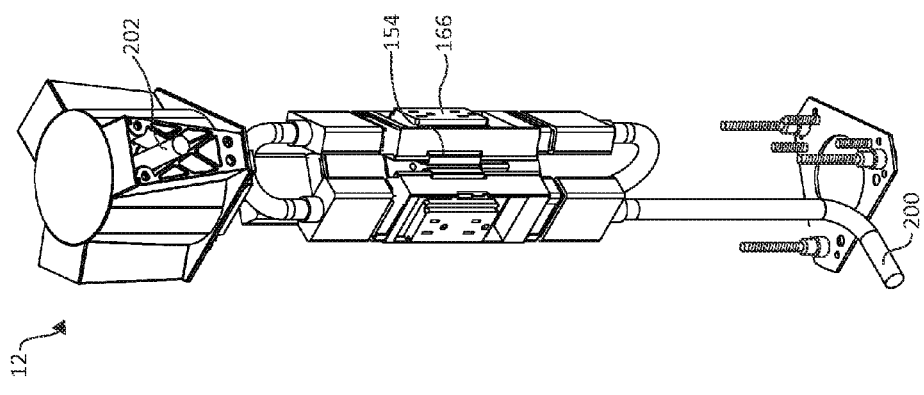
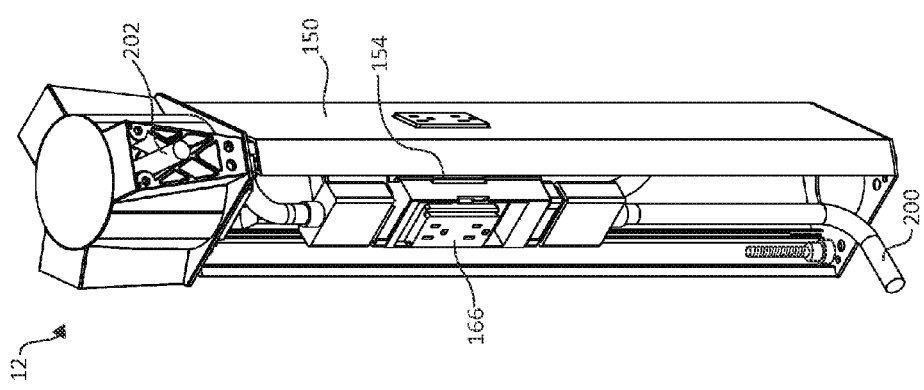
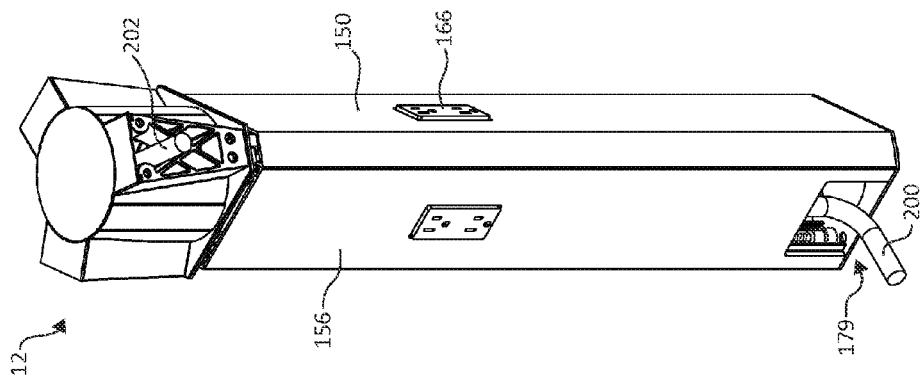

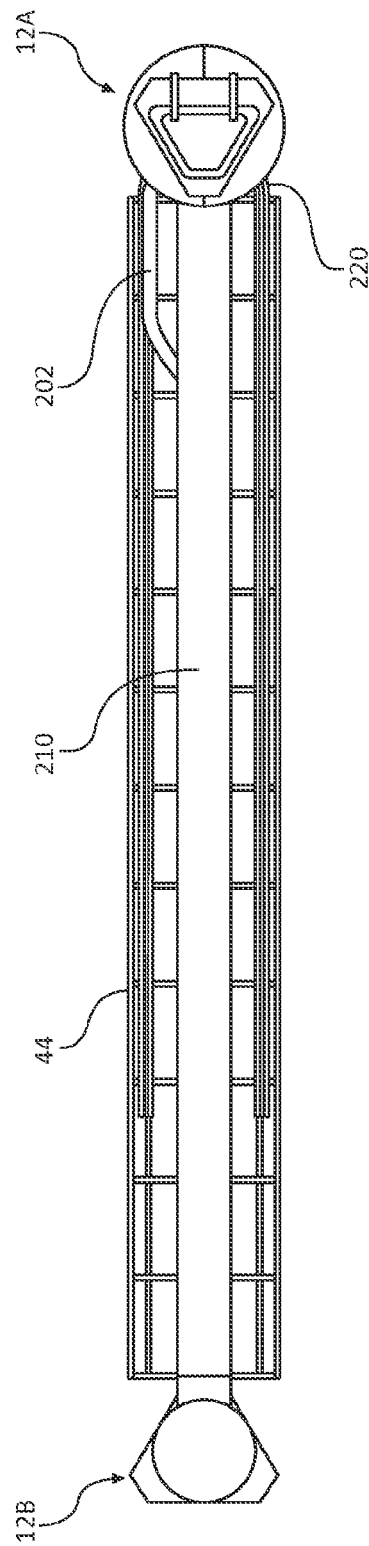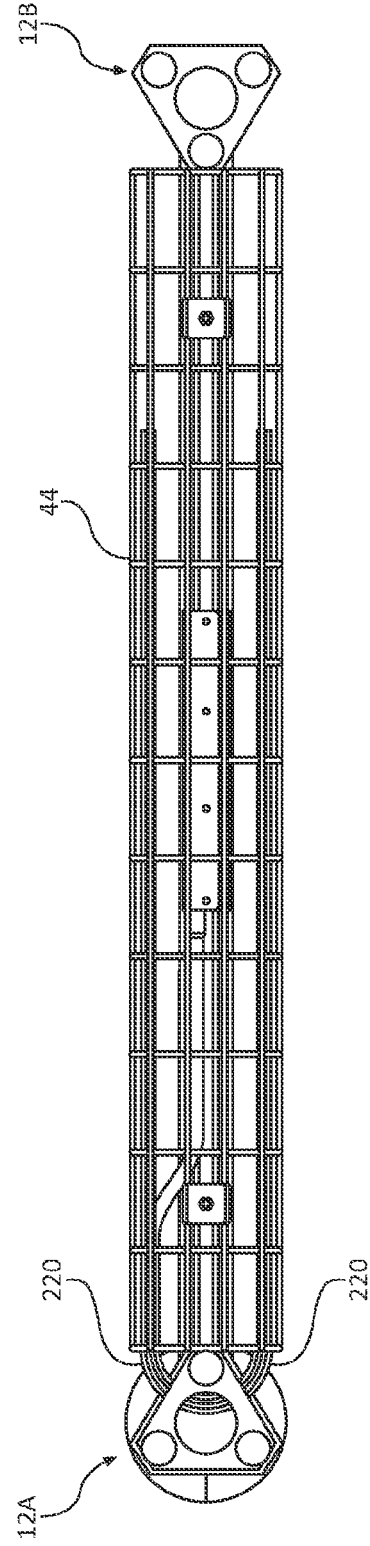
FIG. 50
FIG. 51

CONNECTOR HUB AND MODULAR WORK SYSTEM

CROSS-REFERENCE TO RELATED APPLICATION

This application claims priority to Provisional Application No. 61/882,399, filed Sep. 25, 2013, which is herein incorporated by reference in its entirety.

BACKGROUND

Work space furniture and accessories include a variety of components, such as tables, desks, chairs, electrical devices, communication devices, and others. Efficient use of work space square footage, promotion of work space utility, and desirable work space aesthetics are often of great importance.

SUMMARY

Some aspects relate to a connector hub assembly that is able to be used as a standalone module or as a component in a work space system. In some embodiments, the connector hub module includes features for connecting one or more arms of a support frame of a modular workspace system that includes desk space, cabinet space, view screens, electronic equipment, and/or other components.

Some aspects relate to a modular work system including: a connector hub assembly including, a crown connector module including, a top cover, a crown base, a first connector including an attachment flange, and a first gap member adapted to be received in the top cover and the crown base, and a body assembly adapted to rest on a floor such that the body assembly is supported in an upright position, and a frame member forming an elongate body having a first end adapted to be secured to the first connector of the connector hub assembly.

Some aspects relate to a method of assembling a modular work system, the method comprising: assembling a crown connector module, assembly of the connector module comprising the steps of: securing a first connector onto a crown base; assembling a first gap member onto the crown base, and assembling a top cover onto the first connector and onto the first gap member, securing the crown connector module onto a body module, the body module configured to rest on a floor such that the assembled crown connector module and the body module are supported in an upright position, and securing a first end of an elongate frame member onto the first connector of the crown connector module.

Some aspects relate to a crown connector module comprising: a crown base including a support hub having a plurality of slots, a top cover including a support flange having a plurality of slots, a first connector including an attachment flange, and a first gap member including a channel insert adapted to be received in one of the plurality of slots of the top cover and one of the plurality of slots of the crown base.

Although some features and advantages are described above, a variety of additional or alternative features and advantages are contemplated. While multiple embodiments are disclosed, still other invention embodiments will become apparent to those skilled in the art from the following detailed description, which shows and describes illustrative embodiments—embodiments that are to be regarded as illustrative in nature and not restrictive.

BRIEF DESCRIPTION OF THE DRAWINGS

FIGS. 3 to 10 show a connector hub assembly of the modular work system of FIGS. 1 and 2, according to a first configuration.

FIGS. 23 to 26 show additional configurations of the connector hub assembly, according to some embodiments.

FIGS. 27 to 29 show the connector hub assembly and various electrical and/or communication accessories in various states of assembly, according to some embodiments.

FIGS. 50 and 51 are top and bottom views of the modular work system of FIG. 47.

Although some features are shown in the accompanying drawings, a variety of additional or alternative features and advantages are contemplated.

DETAILED DESCRIPTION

Various inventive aspects disclosed herein relate to a connector hub assembly 12 that provides a versatile framing, electrical, and/or communication hub for workspace, home, or other environment. For example, according to some embodiments, a connector hub assembly includes features for connecting one or more arms of a support frame for supporting a modular workspace system including desk space, cabinet space, view screens, electronic equipment, and/or other workspace system components. Although some features and advantages of various embodiments are described, a variety of additional or alternative features and advantages are contemplated.

Figure 1:
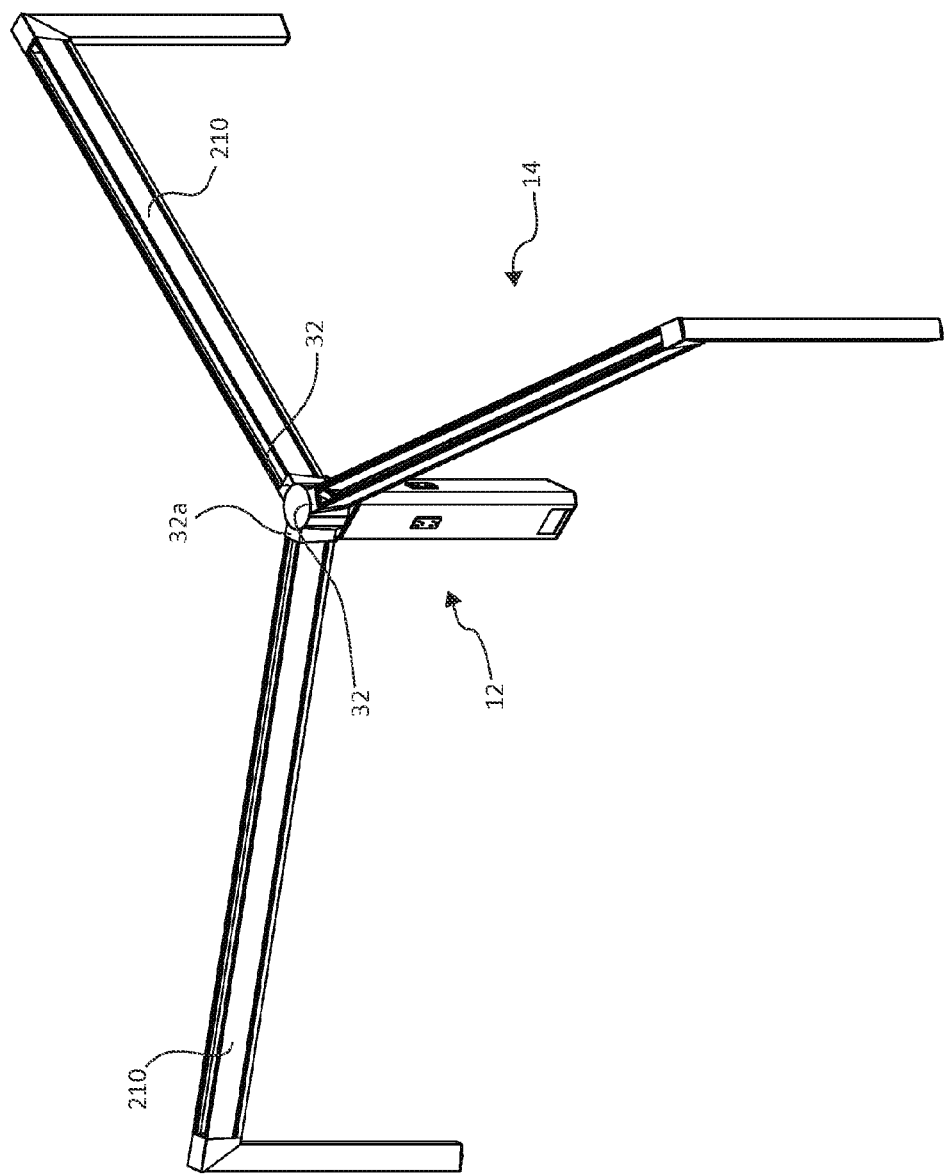
FIGS. 1 and 2 show a modular work system, according to some embodiments.
Figure 2:
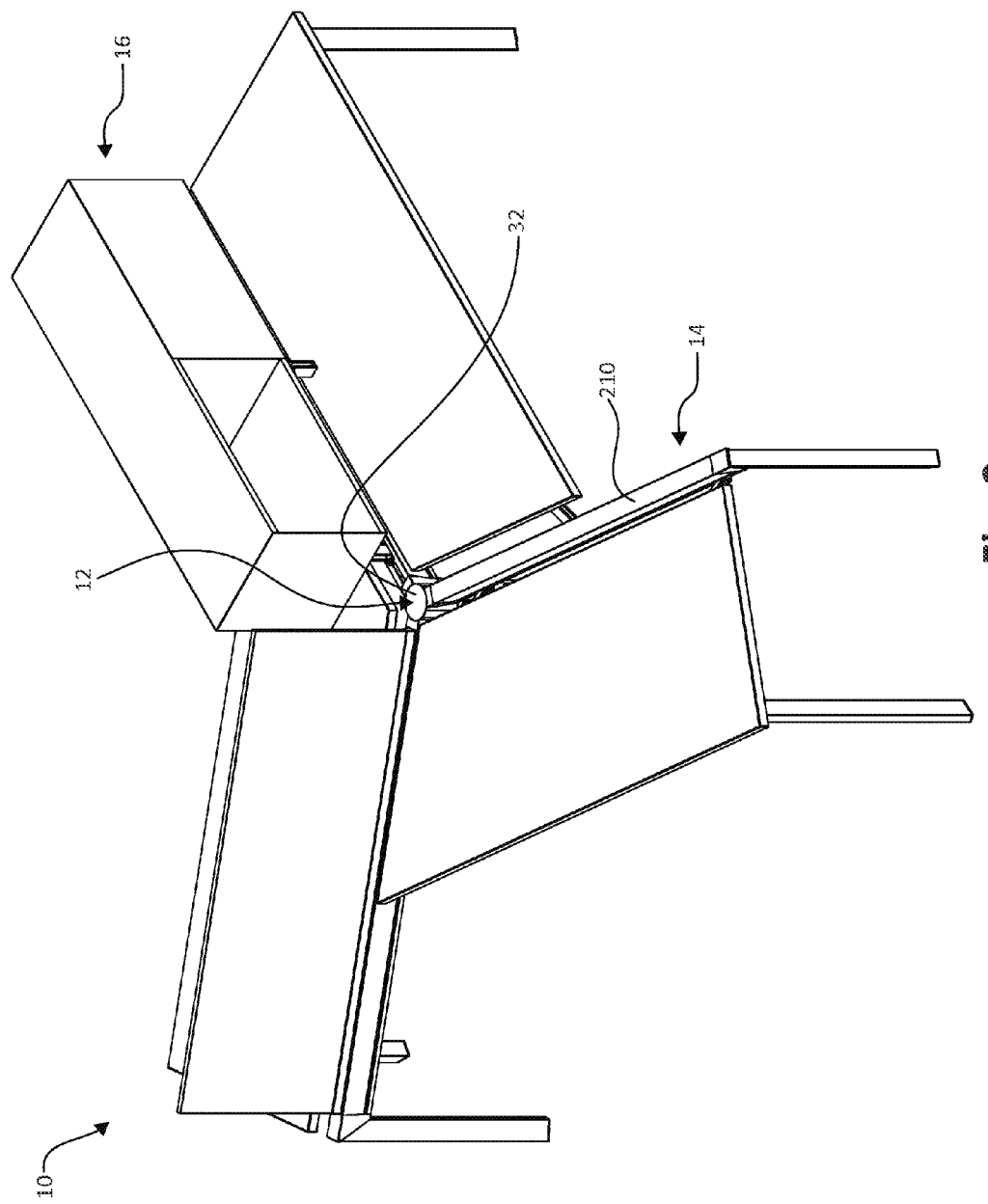
Figure 4:
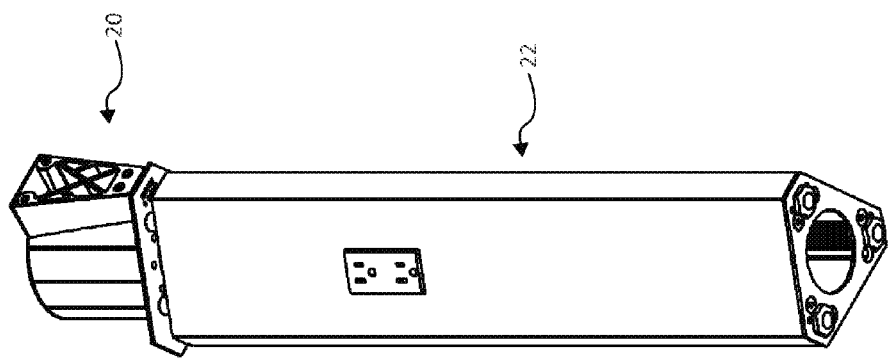

With the foregoing in mind, FIGS. 1 and 2 show a modular work system 10, according to some embodiments. As shown, the modular work system 10 includes a connector hub assembly 12, a frame system 14 secured to the connector hub assembly 12, and workspace system 16 supported by the frame system 14. Various components or portions thereof are formed from a variety of materials including plastic and metal materials. In some embodiments, the various components or portions thereof are formed of cast metal, such as aluminum, iron, steel, or other materials.

Figure 3:
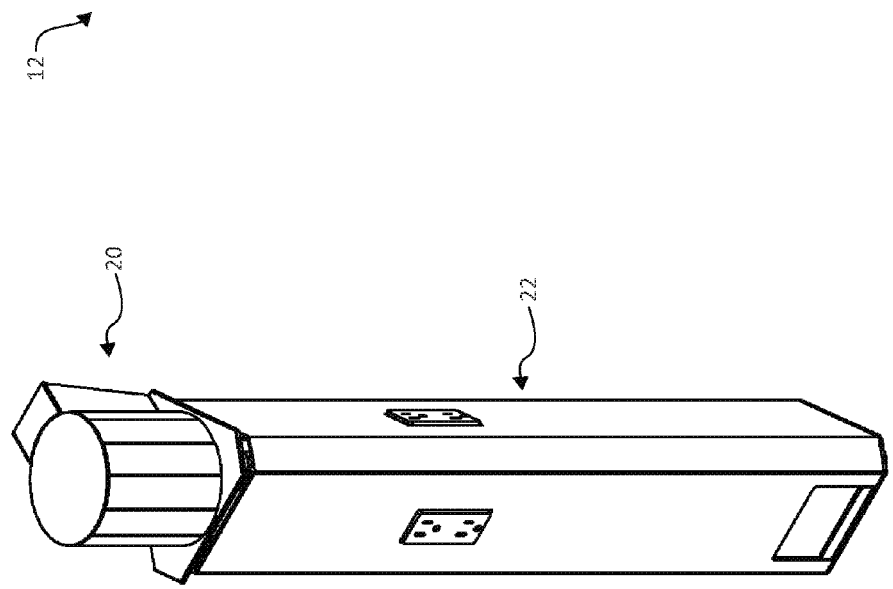
Figure 10:
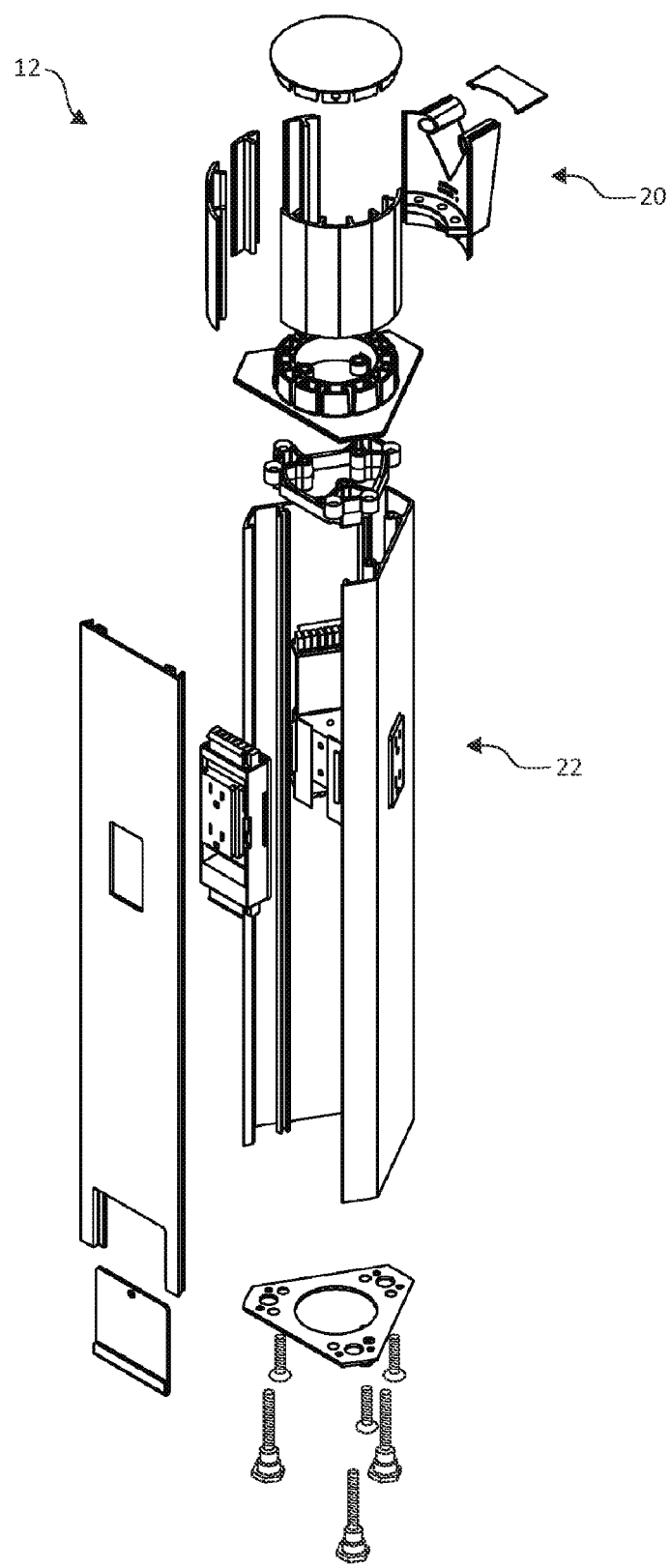
Figure 11:
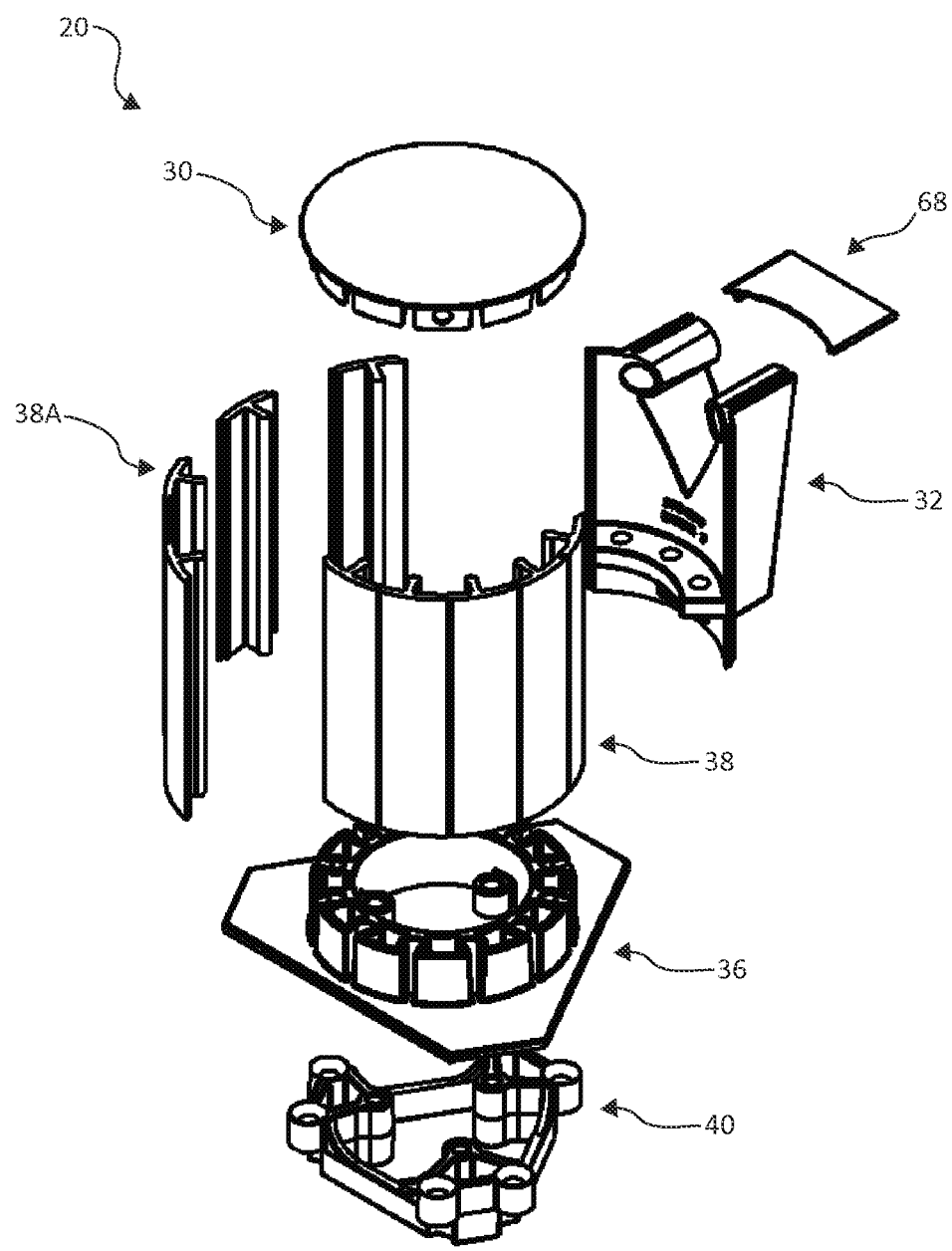
FIG. 11 is an exploded, or disassembled view of a crown connector module of the connector hub assembly of FIGS. 3 to 10, according to some embodiments.

FIGS. 3 through 9 show the connector hub assembly 12 according to a first configuration. FIG. 10 is an exploded, or disassembled view of the connector hub assembly 12. As shown in FIGS. 3 and 10, the connector hub assembly 12 includes a connector module 20 and a body assembly 22 supporting the connector module 20 in an upright position, for example on a building floor. FIG. 11 is an exploded, or disassembled view of the crown connector module 20, according to some embodiments. As shown, the crown connector module 20 includes a top cover 30, a first connector 32a of one or more connectors 32, a crown base 36, a first gap member 38a of one or more gap members 38, and a crown mounting bracket 40.

Figure 12:
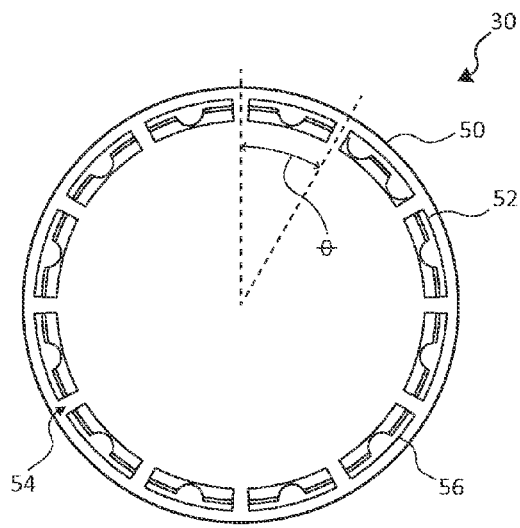
FIG. 12 is a bottom view of a top cover of the crown connector module of FIG. 11, according to some embodiments.

FIG. 12 is a bottom view of the top cover 30, according to some embodiments. As shown, the top cover 30 defines a substantially circle profile and includes a substantially flat, plate shaped crown 50 and a plurality of downwardly projecting teeth 52, or flanges, extending downwardly from the crown 50, the teeth 52 collectively defining a support flange. The teeth 52 define a plurality of gaps 54 between adjacent teeth 52. The top cover 30 also defines an edge portion 56 radially outward of the teeth 52. In some embodiments, each of the gaps 54 has a center-to-center offset θ of about 30 degrees, for example, although a variety of angular offsets are contemplated, such as from about 15 to about 45 degrees, from about 90 degrees to 180 degrees, or other offset as desired. In other embodiments, the gaps 54 vary in angular spacing, for example one gap 54 being about 15 degrees offset from an adjacent gap 54 and another gap 54 being offset about 30 degrees from an adjacent gap 54.

Figure 13:
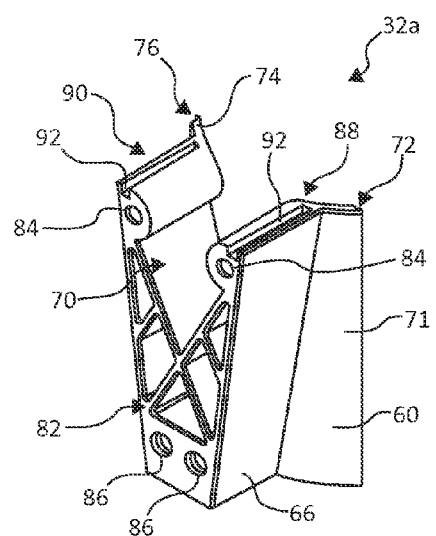
FIGS. 13 and 14 are perspective, or isometric views of a first connector of the crown connector module of FIG. 11, according to some embodiments.
Figure 14:
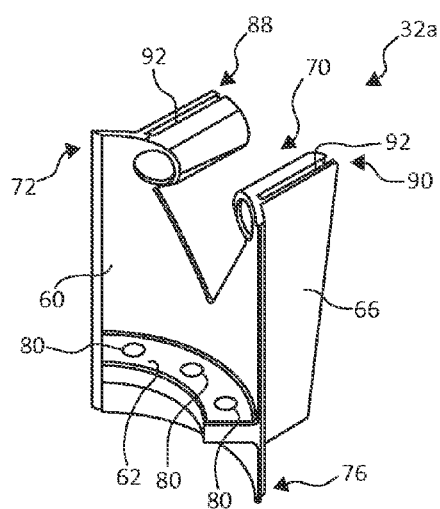

FIGS. 13 and 14 are perspective, or isometric views of the first connector 32a, according to some embodiments. As shown, the first connector 32a includes an inner wall 60 that is substantially arcuate, also described as a perimeter wall, an attachment tab 62 that projects inwardly from the inner wall 60, and an attachment buttress 66 projecting outwardly from the inner wall 60, as well as a connector cover 68 (FIG. 11). In some embodiments, the first connector 32a also defines a channel 70, or feed channel which is substantially V-shaped, or inverted triangle shaped as shown, that extends through the inner wall 60 and the attachment buttress 66. As subsequently described, the channel 70 is optionally used to pass electrical cabling, for example, or other components as desired.

As shown, the inner wall 60 is substantially arcuate, defining a curved surface. In some embodiments, the inner wall 60 has a first side 71 that includes an inner recess 72, a second side 74 that includes an outer recess 76.

The attachment tab 62, also described as a flange, is also substantially arcuate, according to some embodiments. As shown, the attachment tab 62 includes a plurality of fastener holes 80 for receiving means for fastening, such as a threaded bolt (not shown).

In some embodiments, the attachment buttress 66 is trapezoidal from a front profile, or is trapezoidal-shaped, extending from a relatively narrower lower portion to a relatively wider upper portion. As shown, the attachment buttress 66 defines a contact face 82, also described as a mounting face or connection surface, and has fastener holes 84 and guide holes 86 for attachment to a portion of the frame system 14. The attachment buttress 66 has first and second attachment tracks 88, 90 formed into the top surface of the attachment buttress 66. Each of the tracks 88, 90 is substantially similar and includes an inwardly projecting lip 92, according to some embodiments.

Figure 15:
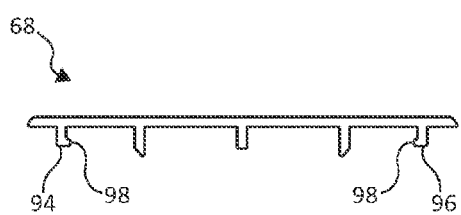
FIG. 15 is an end view of a connector cover of the first connector of FIGS. 13 and 14, according to some embodiments.

FIG. 15 shows the connector cover 68 from an end view, according to some embodiments. As shown, the connector cover 68 includes a first connector rail 94 and a second connector rail 96. Each of the first and second connector rails 94, 96 is substantially similar and includes an inwardly projecting retaining lip 98, according to some embodiments. The connector cover 68 is optionally adapted to be slidably received with the attachment buttress 66 (FIGS. 13 and 14), wherein the first and second connector rails 94, 96 are slidably received in the first and second attachment tracks 88, 90, respectively. The inwardly projecting lips 92 of the tracks 88, 90 and the retaining lips 98 of the first and second connector rails 94, 96 optionally engage to help prevent the connector cover 68 from being lifted from the attachment buttress 66.

Figure 16:
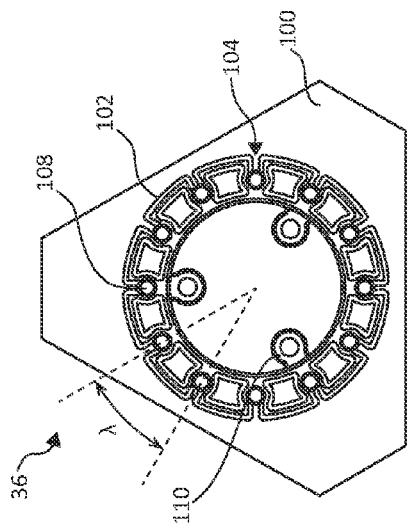
FIGS. 16 and 17 are perspective and top views, respectively, of a crown base of the crown connector module of FIG. 11, according to some embodiments.
Figure 17:
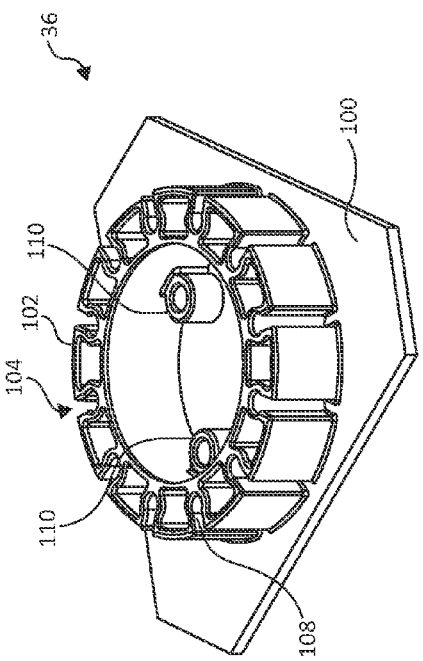

FIGS. 16 and 17 are perspective, or isometric, and top views, respectively, of the crown base 36, according to some embodiments. As shown, the crown base 36 includes an attachment plate 100 and a support hub 102. The attachment plate 100 optionally has a shape of an equilateral triangle with truncated points. In some embodiments, the support hub 102 projects upwardly from the attachment plate 100, where the support hub 102 has a plurality of slots 104 disposed radially about the support hub 102. As shown, each of the slots 104 includes an origin and a terminal end 108, where each of the terminal ends 108 is substantially cylindrical and is adapted to receive a fastener. For example, the terminal ends 108 optionally include female threading suited for engaging with a male threaded fastener, such as a bolt or screw. The crown base 36 also includes a set of fastener ferrules 110 adapted to receive fasteners, such as bolts or screws.

In some embodiments, each of the slots 104 has a center-to-center offset λ of about 30 degrees, for example, although a variety of angular offsets are contemplated, such as from about 15 to about 45 degrees, from about 90 degrees to 180 degrees, or other offset as desired. In other embodiments, the slots 104 vary in angular spacing, for example one slot 104 being about 15 degrees offset from an adjacent slot 104 and another slot 104 being offset about 30 degrees from an adjacent slot 104. In some embodiments, the slots 104 are adapted to be aligned with gaps 54 of the top cover 30 (FIG. 12), such that upon assembly of the connector hub assembly 12 the slots 104 are arranged in a substantially mirror orientation to that of the gaps 54.

Figure 18:
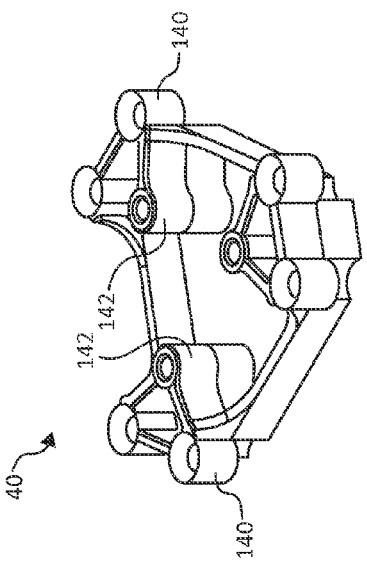
FIG. 18 is an end view of a first gap member of the crown connector module of FIG. 11, according to some embodiments.

FIG. 18 is an end view of the first gap member 38a, according to some embodiments. Each of the plurality of gap members 38 is optionally substantially similar to the first gap member 38a. As shown, the first gap member 38a is generally T-shaped in cross-section and includes an outer surface 120 that is substantially curved, or arcuate, and an inner surface 122 that is substantially curved, or arcuate, a first side 124 that includes an inner recess 126, a second side 128 that includes an outer recess 130, and an attachment rib 132, or web projecting inwardly from the inner surface 122. In some embodiments, the inwardly projecting rib 132 terminates in a retaining feature 134, which is substantially circular in transverse cross-section as shown, although a variety of shapes (e.g., rectangular) are contemplated.

Figure 19:
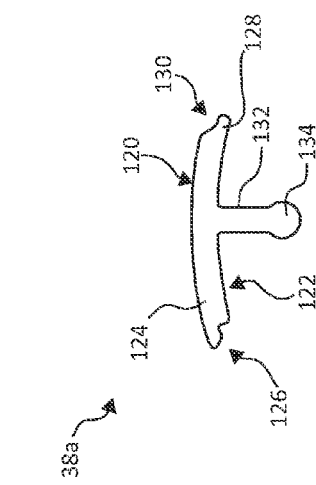
FIG. 19 is a perspective, or isometric view of a crown mounting bracket of the crown connector module of FIG. 11, according to some embodiments.

FIG. 19 is a perspective, or isometric view of the crown mounting bracket 40, according to some embodiments. As shown, the crown mounting bracket 40 includes a plurality of mounting ferrules 140 and a set of inside fastener ferrules 142. In some embodiments, the mounting ferrules 140 and fastener ferrules 142 are arranged in groups of three, with two mounting ferrules 140 grouped with an inside fastener ferrule 142. In some embodiments, the inside fastener ferrules 142 are angularly offset from one another by about 120 degrees, for example, although a variety of angular offsets are contemplated. The fastener ferrules 142 are optionally adapted to mate with a fastener, the fastener ferrules including female threading for mating with a male threaded fastener, such as a bolt or screw, for example.

Figure 20:
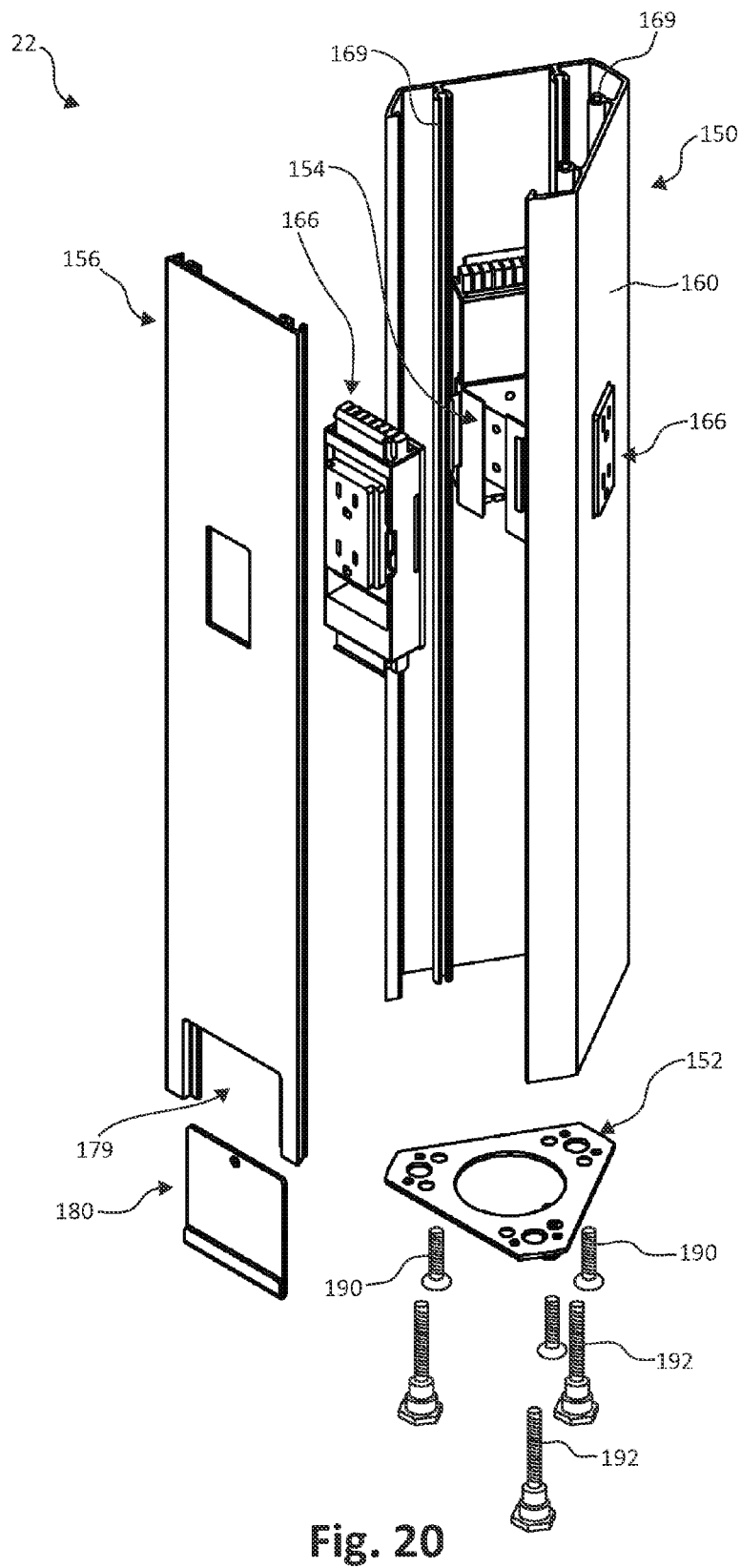
FIG. 20 is a perspective, isometric view of a body assembly of the connector hub assembly of FIGS. 3 to 10 in an unassembled state, according to some embodiments.

FIG. 20 is a perspective, isometric view of the body assembly 22 in an unassembled state, according to some embodiments. Upon assembly (e.g., FIG. 3), the body assembly 22 has a profile of a triangle with truncated points. As shown in FIG. 20, the body assembly 22 includes an enclosure 150, a bottom support 152, an accessory mount 154 adapted to be housed within the enclosure 150, and a body cover 156 adapted to be secured to the enclosure 150.

Figure 21:
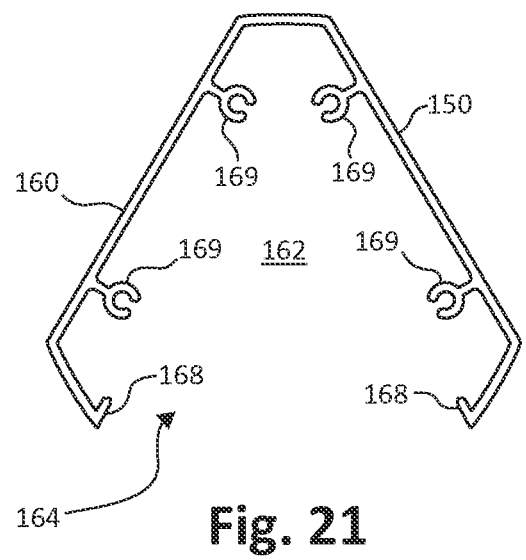
FIG. 21 is a top view of an enclosure of the body assembly of FIG. 20, according to some embodiments.

FIG. 21 shows a top view of the enclosure 150, according to some embodiments. As shown in FIG. 20, in some embodiments, the enclosure 150 includes a wall 160 defining an interior space 162 with an open front face 164. The enclosure 150 optionally includes one or more openings for an electrical and/or communication (or data) accessory 166, such as an electrical outlet. As shown, the enclosure 150 includes attachment prongs 168 adjacent the open front face 164 that project inwardly toward the interior space 162, as well as a plurality of fastener channels 169, with a pair of the fastener channels 169 on each side of the wall 160 according to some embodiments.

FIG. 20 shows the accessory mount 154, according to some embodiments. As shown, the accessory mount 154 is adapted to be housed within and secured to the wall 160 of the enclosure 150. In some embodiments, the accessory mount 154 is slidably received in one or more of the fastener channels 169 of the enclosure 150. The accessory mount 154 is optionally configured to be secured to and support electrical and/or communication (or data) accessories 166, such as the electrical outlets shown.

Figure 22:
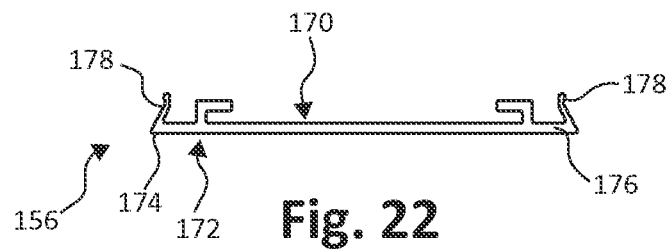
FIG. 22 shows a top view of a body cover of the body assembly of FIG. 20, according to some embodiments.

FIG. 22 shows a top view of the body cover 156, according to some embodiments. As shown, the body cover 156 includes an inner surface 170, an outer surface 172, a first side 174, and a second side 176. In some embodiments, the body cover 156 includes attachment tabs 178 on the first and second sides 174, 176 of the body cover 156. The attachment tabs 178 are adapted to form a complementary fit with the attachment prongs 168 of the enclosure 150. In some embodiments, the body cover 156 is slidable vertically downward with the attachment tabs 178 received against the attachment prongs of the enclosure 150 so that the body cover 156 covers the open front face 164 of the enclosure 150. As shown in FIG. 20, the body cover 156 includes an access opening 179 for accessing the interior space 162 of the enclosure 150 following assembly of the body assembly 22 and an access door 180 configured to cover the opening 179. As shown in FIG. 22, the body cover 156 includes a pair of retaining features 182 for slidably receiving edges of the access door 180 such that the access door 180 is able to be raised and lowered in use.

As shown in FIG. 20, the bottom support 152 is adapted to be secured to the enclosure 150 and to rest on a floor such that the body assembly 22 is supported in an upright position, or in a generally vertical position. In some embodiments, the bottom support 152 is shaped as a triangle with truncated points. As shown, the bottom support 152 includes a plurality of apertures for securing the enclosure 150 to the bottom support 152 using a plurality of fasteners 190. In some embodiments, the apertures are also adapted to receive a plurality of foot members 192.

FIGS. 23 to 26 show additional configurations of the connector hub assembly 12, according to some embodiments. As shown, the connector hub assembly 12 optionally employs a single connector 32 (e.g., FIG. 23), two connectors 32 (e.g., FIG. 24), three connectors 32 (e.g., FIG. 25), four connectors 32 (e.g., FIG. 26) or more as desired. As shown, the number and positioning of the gap members 38 are adjusted for accommodating the desired number of connectors 32.

Assembly of the modular work system 10 includes assembling the various components of the connector hub assembly 12. In some embodiments, the method of assembly also includes securing the frame system 14 to the connector hub assembly 12, as well as securing associated workspace system 16 components, either directly or indirectly through the frame system 14, to the connector hub assembly 12. In some embodiments, a single connector hub assembly 12 is employed and in other embodiments multiple connector hub assemblies similar to the connector hub assembly 12 are employed. The connector hub assembly 12 is also optionally employed as a stand-alone component, with a simple cap, an organizer top, a table top, or other accessory secured to the connector hub assembly 12 in addition to, or as a replacement for, the entire crown connector module 20 or portions thereof.

In some embodiments, the connector hub assembly 12 is assembled by securing the crown mounting bracket 40 to the crown base 36 with a plurality of fasteners (not shown), such as threaded bolts. For example, the fastener ferrules 110 and 142 of the crown base 36 and mounting bracket 40, respectively, are optionally aligned and the mounting bracket 40 is brought into contact with the bottom of the attachment plate 100. In some embodiments, fasteners are passed downwardly through the fastener ferrules 110 and mated with threads of the inside fastener ferrules 142 to secure the crown mounting bracket 40 to the crown base 36.

The first connector 32a is secured at a desired location about the crown base 36. In some embodiments, the first connector 32a is secured to the crown base 36 by aligning the fastener holes 80 of the attachment tab 62 with the terminal ends 108 of corresponding slots 104 of the support hub 102. Fasteners (not shown) are optionally passed through the fastener holes 80 into the terminal ends 108 and mated with female threading of the slot terminal ends 108. If desired, additional connectors 32 are then secured in a substantially similar manner at additional locations about the crown base 36 (e.g., with two connectors 32 positioned 180 degrees apart, 90 degrees apart, or 60 degrees apart around the circumference of the support hub 102).

In some embodiments, the first gap member 38*a* is positioned with the attachment rib 132 received in one of the slots 104 of the support hub 102 with the retaining feature 134 received in the terminal end 108 of the slot 104. The first gap member 38*a* is optionally positioned adjacent the first connector 32*a* such that the inner recess 126 of the first gap member 38*a* is adjacent the second side 74 of the first connector 32*a* with the outer recess 76 of the first connector 32*a* forming a complementary fit with the inner recess 126 of the first gap member 38*a*. The respective edges, or sides, of the first connector 32*a* and the first gap member 38*a* are thereby mated, or matched. A second gap member 38 is optionally positioned adjacent the first side 72 of the first connector 32*a* with an outer recess of the gap member 38 forming a complementary fit with the inner recess 72 of the first connector 32*a*.

Additional gap members 38 are disposed in free, or unfilled slots 104 around the support hub 102 as desired in order to releasably secure the gap members 38 to the support hub 102. In different terms, the gap members 38 are optionally utilized to "fill in" or otherwise complete a wall extending around the support hub 102, whether a single connector 32 is secured to the support hub 102 or multiple connectors 32 are secured to the support hub 102. Adjacent gap members 38 are optionally aligned edge-to-edge such that an inner recess of one gap member 38 is aligned with an outer recess of an adjacent gap member 38.

In some embodiments, the top cover 30 is positioned with the gaps 54 defined between the teeth 52 aligned with the slots 104 of the support hub 102. Upon assembly, the top cover 30 is optionally positioned with the attachment ribs, such as the attachment rib 132, of the gap members 38 received in the gaps 54 such that the edge portion 56 rests on the tops of the one or more gap members 38 and the tops of the one or more connectors 32.

The first and second connector rails 94, 96 of the connector cover 68 are slidably received in the first and second attachment tracks 88, 90 of the attachment buttress 66, according to some embodiments. The inwardly projecting retaining lips 98 and the inwardly projecting lips 92 are optionally engaged to help prevent the connector cover 68 from being lifted from the attachment buttress 66.

Assembly of the body assembly 22 optionally includes securing the enclosure 150, the bottom support 152, the accessory mount 154 and the body cover 156 together. In some embodiments, the accessory mount 154 is secured in a generally central location along the height of the enclosure 150, although a variety of locations are contemplated. FIGS. 27 to 29 show the connector hub assembly 12 and various electrical and/or communication (or data) accessories in various states of assembly. As shown, the accessory mount 154 is optionally configured to support one or more electrical and/or communication (or data) accessory 166, such as a plurality of AC outlets and associated wiring. As shown, the accessory 166 includes a power supply cable 200 and a power transfer cable 202, where power supply cable 200 is optionally secured to a source of power for powering the AC outlets. Power transfer cable 202 is configured for transferring power from the connector hub assembly 12 to one or more additional locations (e.g., through the frame system 14 to another connector hub assembly similar to connector hub assembly 12). In various embodiments, discussed in greater detail below, power transfer cable 202 (or alternatively power supply cable 200) is externally routed (e.g., not through frame system 14) to such one or more additional locations. Moreover, while FIGS. 27 to 29 illustrate a power supply cable 200 delivering power to the modular work station from a floor location, as discussed in greater detail below, power may be additionally or alternatively supplied to the modular work station from a ceiling location.

As shown in FIG. 27, the body cover 156 is placed over the open front face 164 (FIG. 21) of the enclosure 150. In some embodiments, the power supply cable 200 travels along a floor of a workspace (such as an office space floor), and is fed through the access opening 179 into the interior space 162 of the enclosure 150. The access door 180 is optionally left partly open, fully open, or removed to allow the power supply cable 200 a path into the interior space 162. According to some embodiments, the bottom support 152 is secured to the enclosure 150 and the body cover 156. For example, the plurality of fasteners 190 are secured through apertures in the bottom support 152 and into the fastener channels 169 of the enclosure 150, which optionally include female threading to assist with securing the fasteners 190 to the enclosure 150. The foot members 192 are optionally secured to the bottom support 152 to assist with supporting the enclosure 150 on a surface, such as an office space floor. In various embodiments, as discussed in greater detail below, a power supply cable 200 alternatively or additionally travels through a ceiling of a workspace and is fed from the ceiling down to a modular work system, such as modular work system 10. Similarly, in various embodiments discussed in greater detail below, data cabling can be routed through the same means. By providing a supply of power and/or cabling to the modular work system according to the embodiments disclosed herein, the modular work system provides for easy and efficient installation and disassembly and can be located in virtually any space and in any suitable configuration.

In some embodiments, the crown mounting bracket 40 is secured to the top of the enclosure 150 before securing the mounting bracket 40 to the crown base 36, although a variety of assembly sequences are contemplated. Regardless, in some embodiments, the crown mounting bracket 40 is optionally secured to enclosure 150 by receiving a plurality of fasteners (not shown) through the mounting ferrules 140 and into the fastener channels 169 of the enclosure 150. As described previously, the fastener channels 169, or portions thereof, are optionally provided with female threading to mate with fasteners, such as male threaded bolts, for example. In some embodiments, the power transfer cable 202 or other variety of cabling, is passed through the feed channel 70 in the first connector 32*a*. Where multiple connectors 32 are employed additional cabling is passed through corresponding feed channels of the connectors 32 as desired. With the crown mounting bracket 40 secured to the enclosure 150 and the crown base 36 secured to the mounting bracket 40, the connector module 20 and the body assembly 22 are secured together in accordance with some embodiments.

Figure 30:
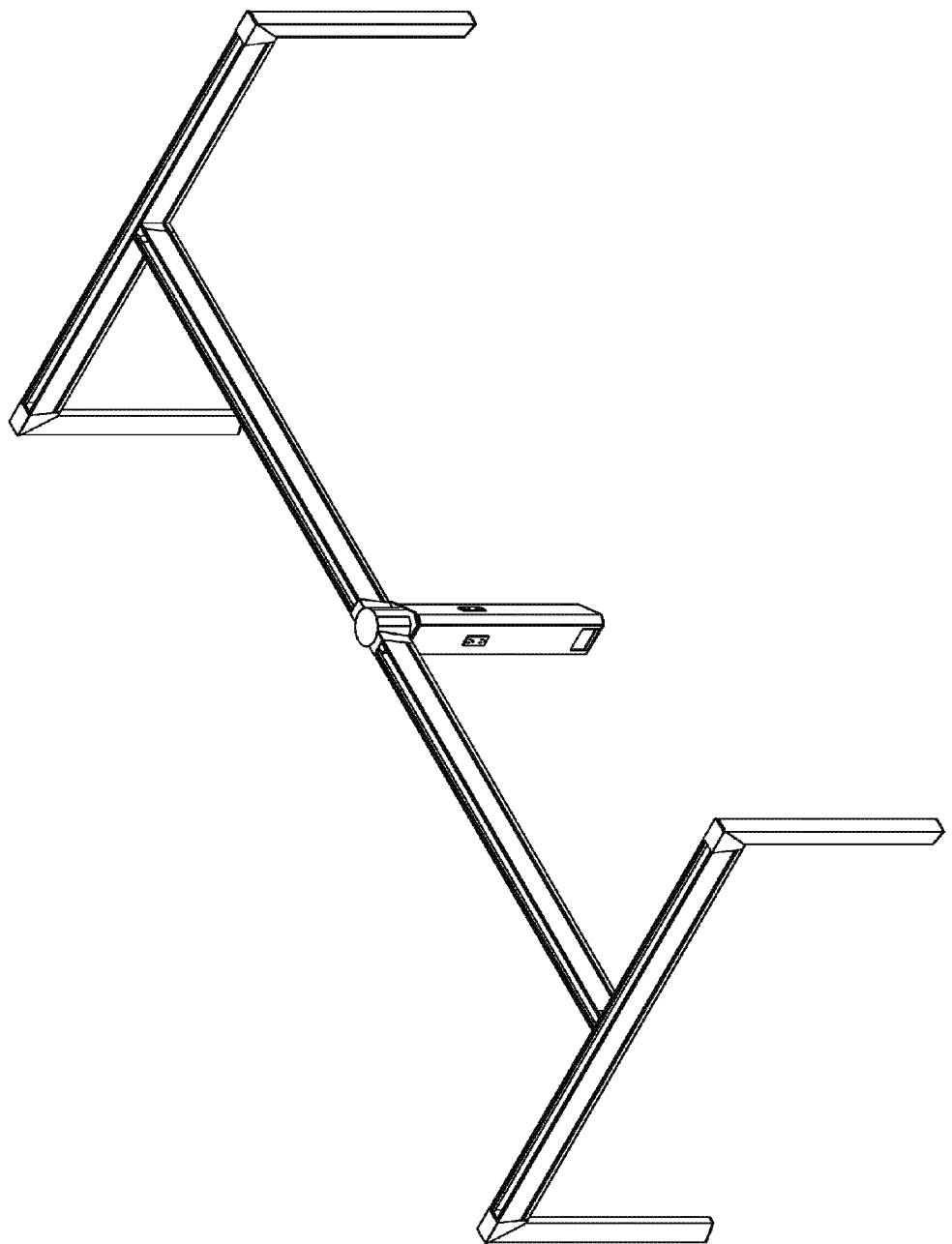
FIGS. 30 and 31 show framing configurations of the modular work system, according to some embodiments.
Figure 31:
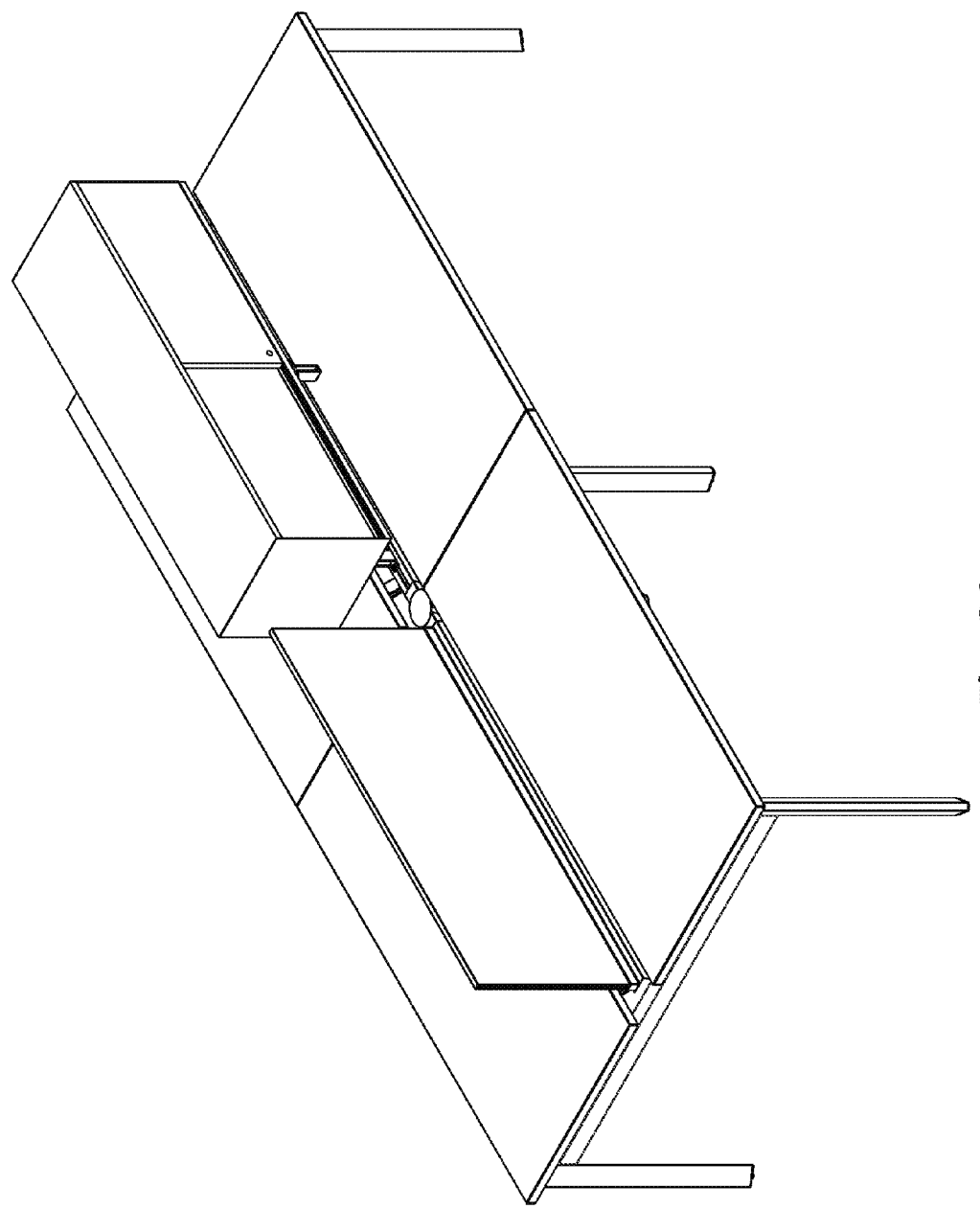

As indicated in FIG. 1, a frame system 14 including one or more frame members 210 is optionally secured to the connector hub assembly 12. For example, one of the frame members 210 is optionally secured to the connector hub assembly (e.g., bolted) using the fastener holes 84 of the first connector 32*a*. As shown, additional frame members 210 are optionally secured to the hub assembly 12 with additional connectors (e.g., in a 120 degree angular separation pattern, or other angular separation as desired, such as a 180 degree separation pattern as shown in FIGS. 30 and 31). In some embodiments, the power transfer cable 202 or additional or alternative cabling is passed into one or more of the frame members 210 as desired, for example to power electrical outlets or other types of electrical or communication (or data) couplings in the frame members (not shown) or workspace system 16 secured to the frame system 14. In some other embodiments, the power transfer cable 202 or additional or alternative cabling is routed external to frame members 210 as desired.

Figure 32:
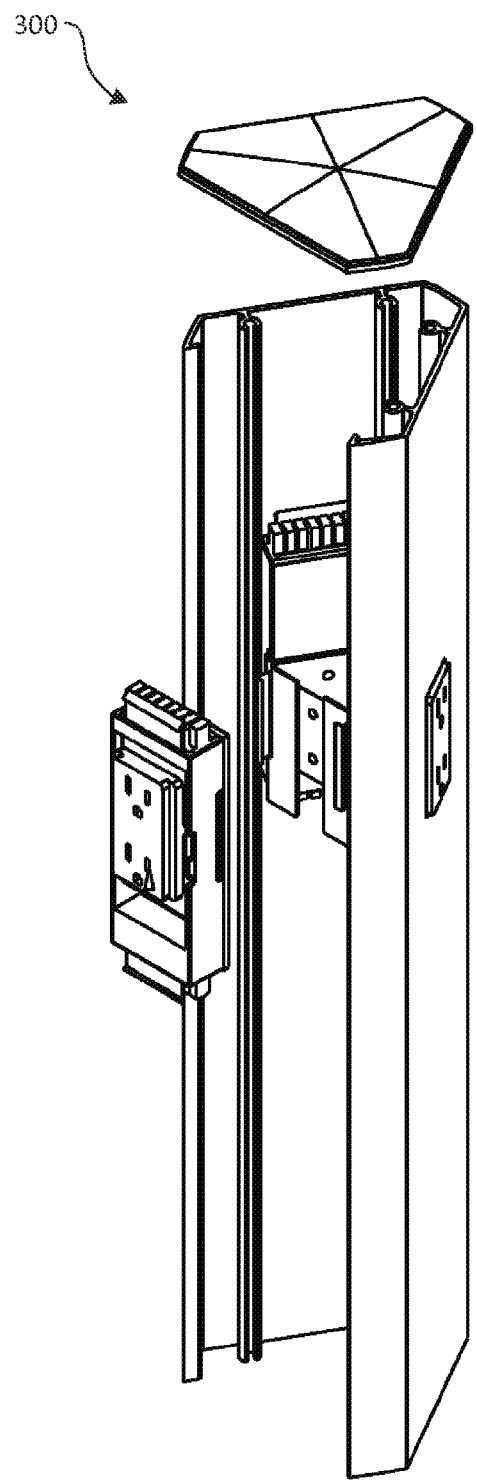
FIGS. 32 to 34 show top caps of the connector hub assembly, according to some embodiments.

FIG. 32 is a perspective, or isometric view, showing a top cap 300 that is optionally utilized in place of, or as a supplement to the crown connector module 20 (FIG. 3), according to some embodiments. As shown, the top cap 300 is substantially flat, or planer, overall and is optionally employed where framework is not to be secured to the hub assembly 12 (FIG. 3). One instance of such use would be an application where the connector hub assembly 12 is utilized as a standalone power and/or communication (or data) tower, for example, where users are able to connect desired devices to the tower. In some embodiments, the top cap 300 includes prongs, nodules, or fasteners (not shown) for engaging with the mounting ferrules 140 (FIG. 19) of the crown mounting bracket 40, the crown mounting bracket 40 having been assembled to the enclosure 150 (FIG. 20) with a remainder of the crown connector module 20 removed or not installed.

Figure 33:
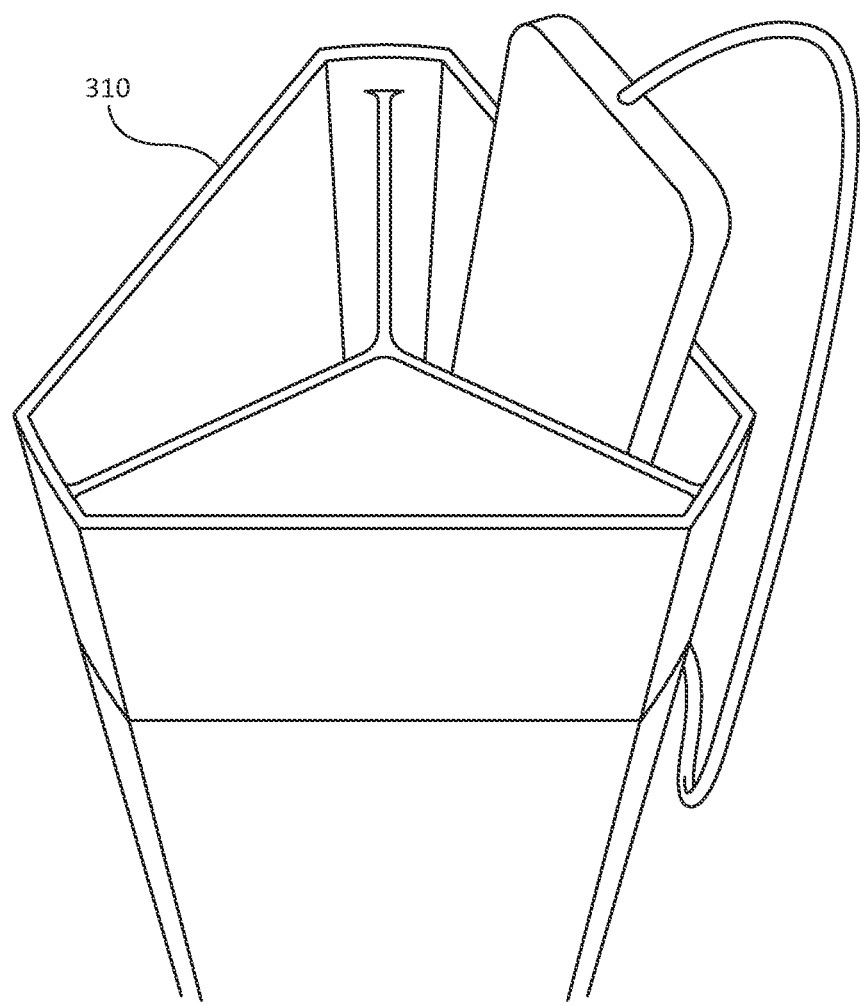

FIG. 33 is a perspective, or isometric view, showing another top cap 310 that is optionally utilized in place of, or as a supplement to the crown connector module 20 (FIG. 3), according to some embodiments. As shown, the top cap 310 defines one or more compartments 312 that are usable for a variety of purposes, such as holding a device connected to the connector hub assembly 12. In some embodiments, the top cap 310 includes prongs, nodules, or fasteners (not shown) for engaging with the mounting ferrules 140 (FIG. 19) of the crown mounting bracket 40, the crown mounting bracket 40 having been assembled to the enclosure 150 (FIG. 20) with a remainder of the crown connector module 20 removed or not installed.

Figure 34:
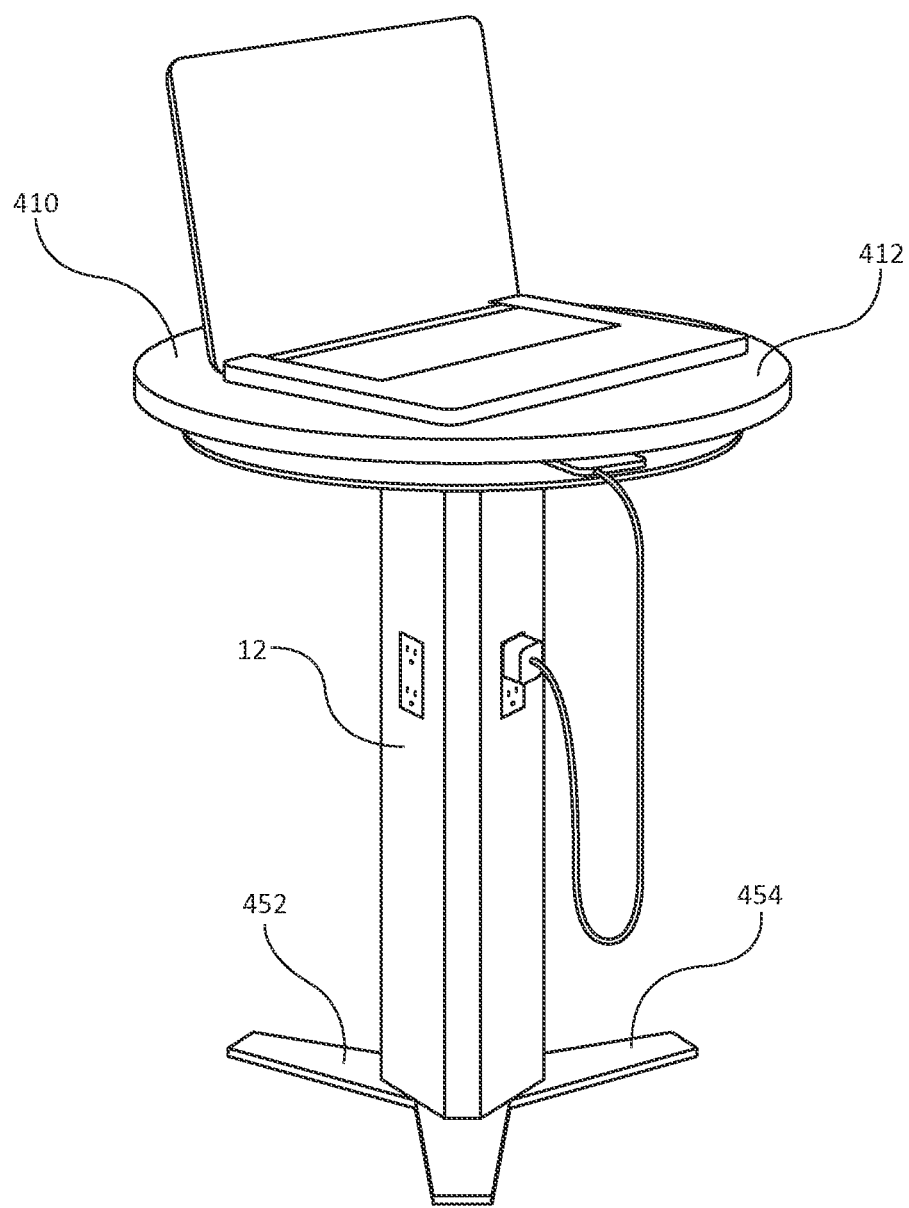

FIG. 34 is a perspective, or isometric view, showing another top cap 410 that is optionally utilized in place of, or as a supplement to the crown connector module 20, according to some embodiments. As shown, the top cap 410 defines a work surface 412, such as a table top work surface, that has a substantially larger outer profile, or footprint, than the outer profile of the enclosure 150 (FIG. 20). As shown, the connector hub assembly 12 also includes another bottom support 452 with elongated feet 454 for additional stability and support. Although three elongated feet 454 are shown, any number are contemplated, including a single foot that is a continuous, enlarged radius plate, for example. In some embodiments, the top cap 410 includes prongs, nodules, or fasteners (not shown) for engaging with the mounting ferrules 140 (FIG. 19) of the crown mounting bracket 40, the crown mounting bracket 40 having been assembled to the enclosure 150 with a remainder of the crown connector module 20 removed or not installed.

Figure 35:
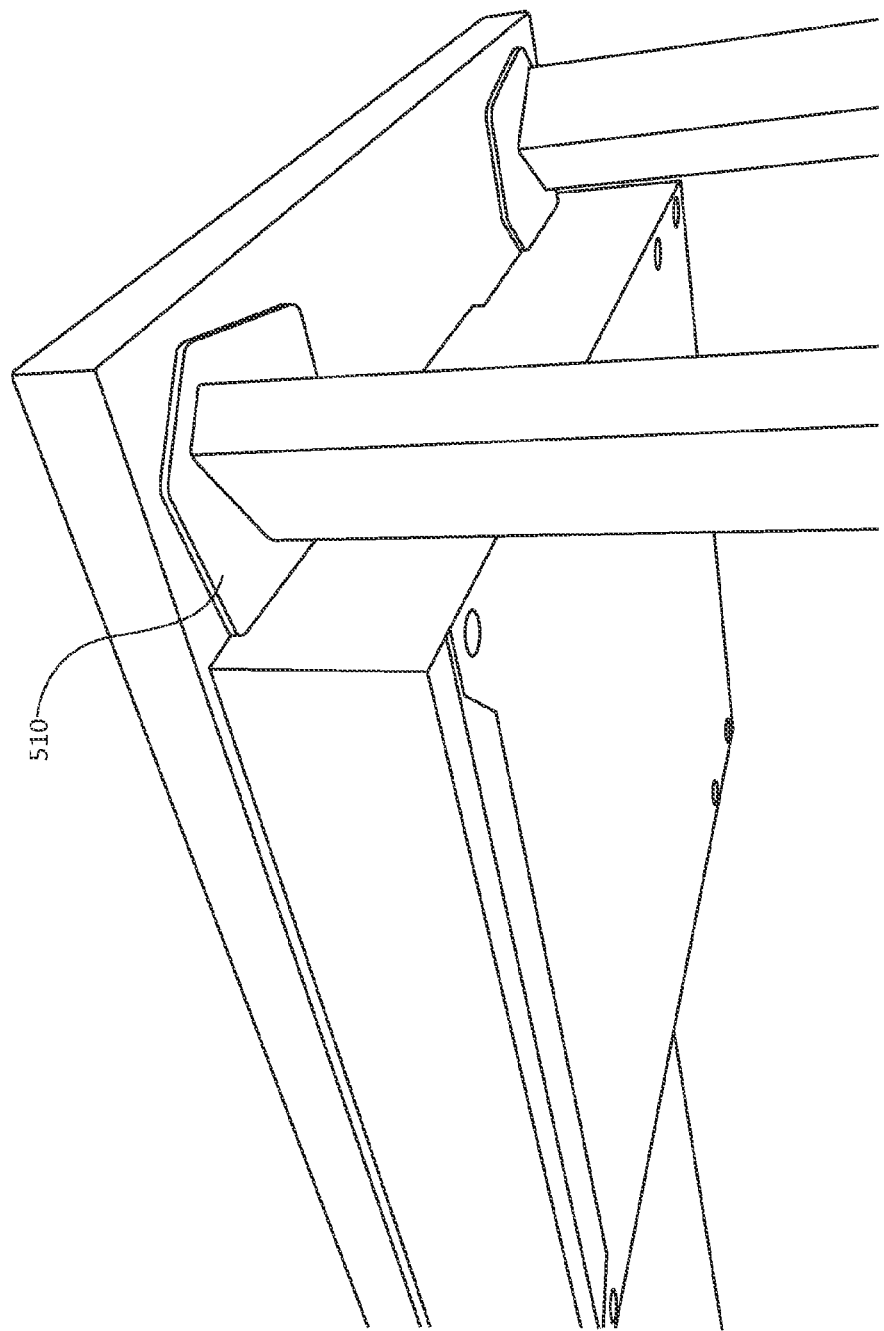
FIGS. 35 and 36 show top caps of a leg assembly, according to some embodiments.

FIG. 35 is a perspective, or isometric view, showing another top cap 510 that is optionally utilized in place of or as a supplement to the crown connector module 20, according to some embodiments. As shown, the top cap 510 is mounted on a leg assembly that is similar to the body assembly 22, but is optionally provided without features for electrical, communication (such as data), or other connectivity to users of the workspace system 16. The top cap 510 is a connector plate for securing the connector hub assembly 12 to a work surface, such as a table with the connector hub assembly 12 serving as a support leg for the work surface. In some embodiments, the top cap 510 includes prongs, nodules, or fasteners (not shown) for engaging with the mounting ferrules 140 (FIG. 19) of the crown mounting bracket 40, the crown mounting bracket 40 having been assembled to the enclosure 150 (FIG. 20) with a remainder of the crown connector module 20 removed or not installed.

Figure 36:
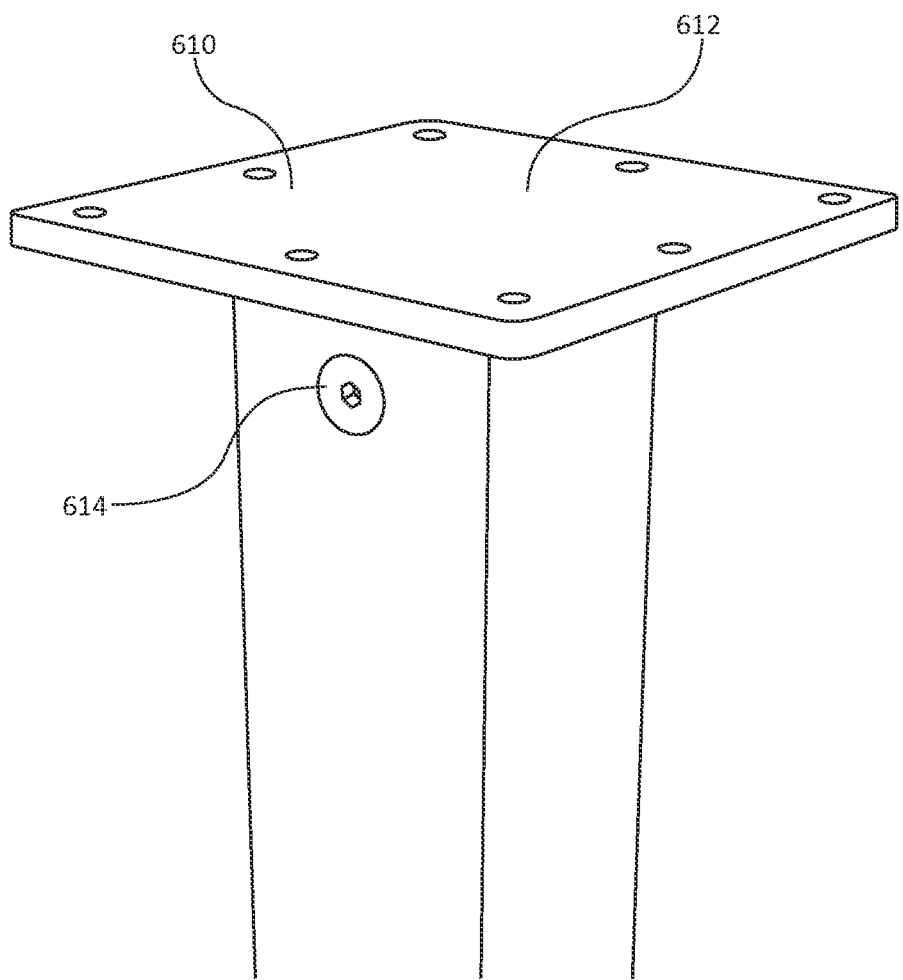

FIG. 36 is a perspective, or isometric view, showing another top cap 610 that is optionally utilized in place of or as a supplement to the crown connector module 20 (FIG. 3), according to some embodiments. As shown, the top cap 610 is mounted on a leg assembly that is similar to the body assembly 22, but is optionally provided without features for electrical, communication (or data), or other connectivity to users of the workspace system 16. The top cap 610 includes an upper telescoping component 612 and a lock component 614, where the upper telescoping component 612 is adjustably received in the enclosure 150 and the lock component 614 locks the upper telescoping component 612 to the enclosure 150 at a desired extension height from the enclosure 150 (FIG. 20). As shown in FIG. 36, the upper telescoping component 612 is fully received in the enclosure 150 at a minimum overall height.

Figure 37:
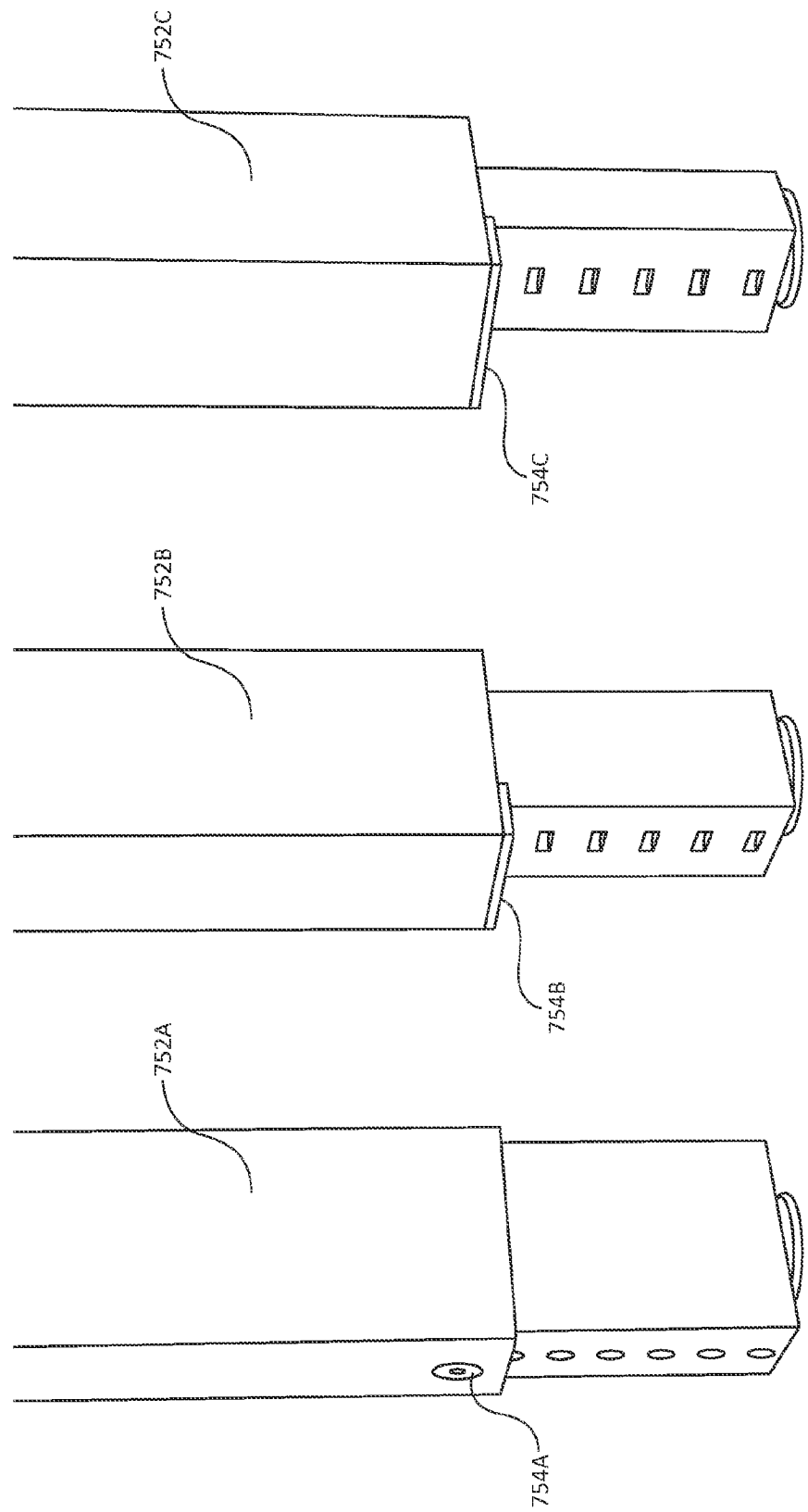
FIGS. 37 and 38 show telescoping bottom supports of a leg assembly, according to some embodiments.
Figure 38:
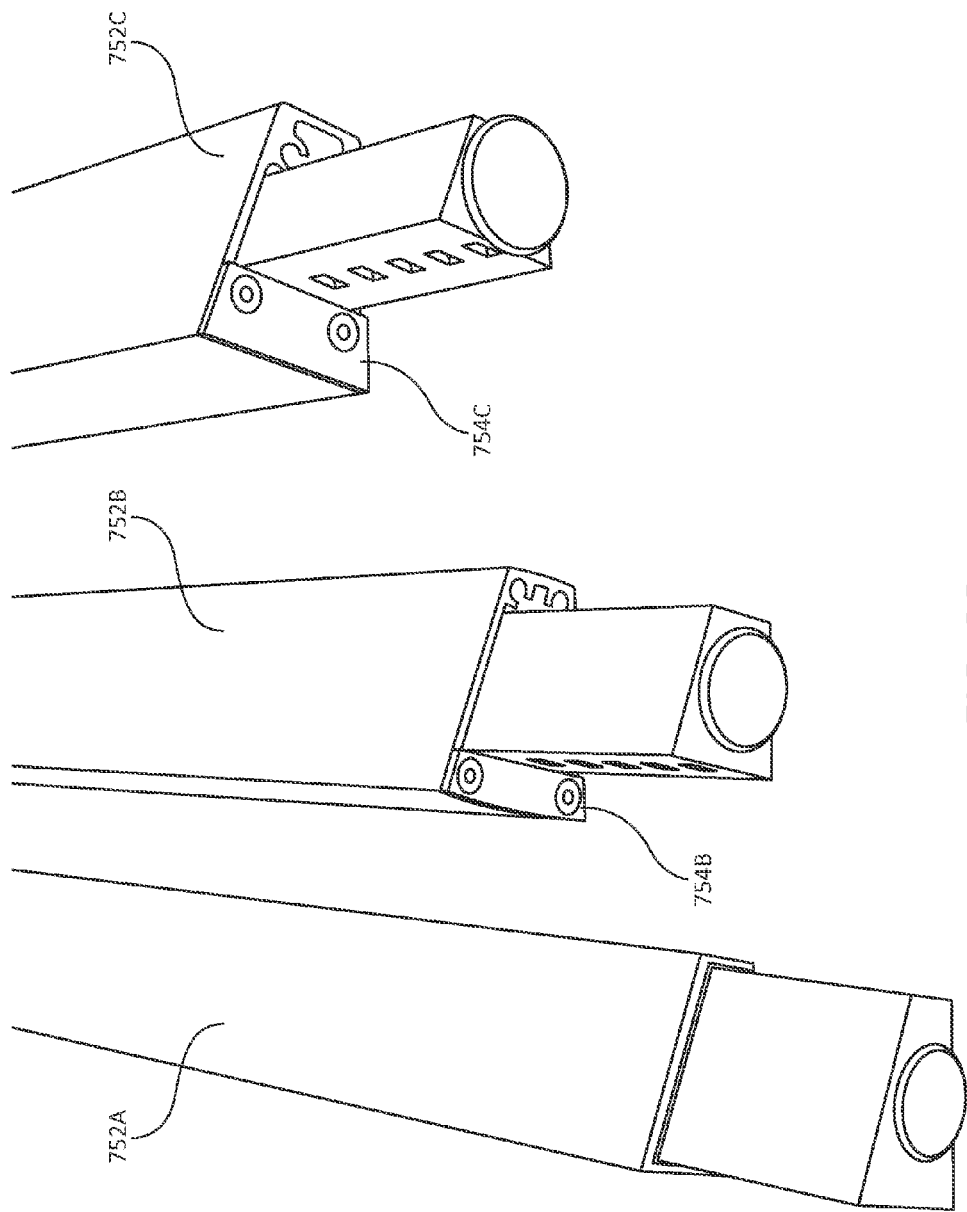

FIGS. 37 and 38 include perspective, or isometric views, showing a plurality of telescoping bottom supports 752A, 752B, 752C that are each optionally used in place of bottom support 152, according to some embodiments. As shown, the bottom supports 752A, 752B, 752C, are mounted on a leg assemblies that are similar to the body assembly 22, but are optionally provided without features for electrical, communication (or data), or other connectivity to users of the workspace system 16. The telescoping bottom supports 752A, 752B, and 752C, each include locking components 754A, 754B, 754C, respectively. With telescoping bottom support 752A, the locking component 754A is a fastener received through the body of the enclosure 150 and engaged with one of a plurality of apertures in the telescoping bottom support 752A to fix the telescoping bottom support 752A at a desired height. With the telescoping bottom supports 752B, 752C, the locking components 754B, 754C are each plates that are secured to the bottom of the enclosure 150 to engage one of a plurality of apertures in the telescoping bottom supports 752B, 752C to fix the telescoping bottom supports 752B, 752C at a desired height.

Figure 39:
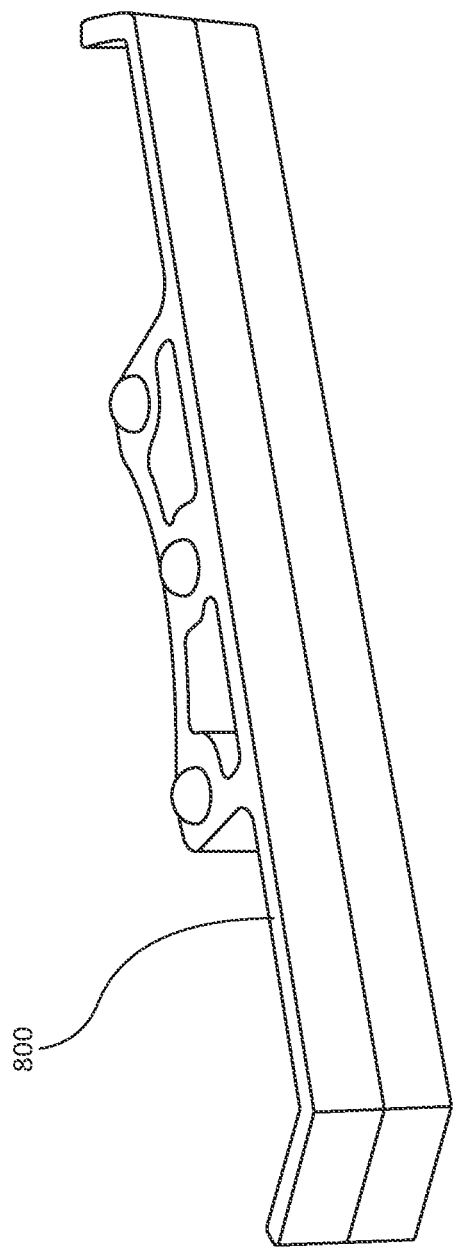
FIGS. 39 and 40 show a spacer of the connector hub assembly, according to some embodiments.
Figure 40:
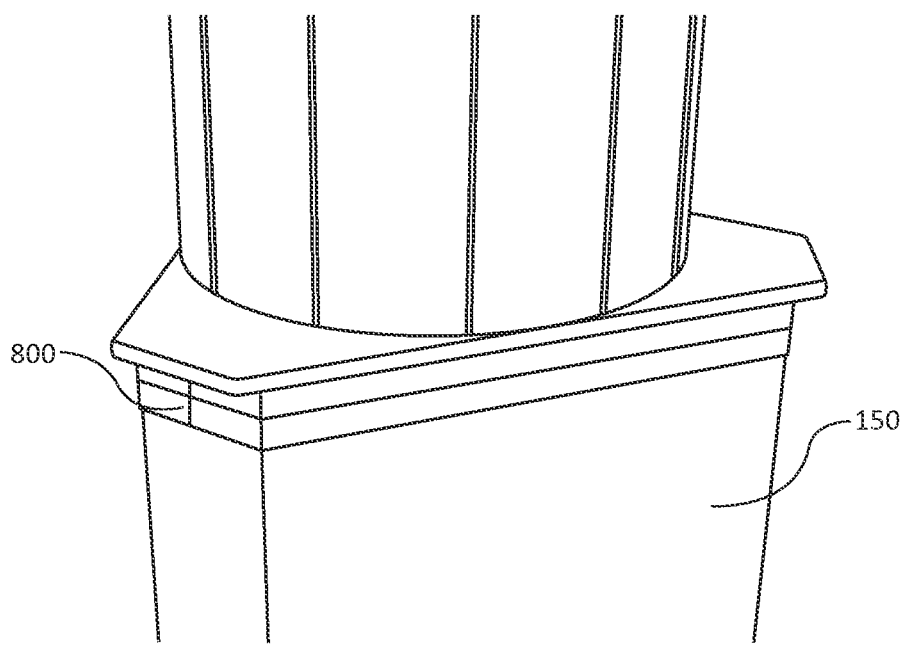

FIGS. 39 and 40 are perspective, or isometric views, showing a filler 800, also described as a cover, that is optionally utilized as a supplement to the crown connector module 20, according to some embodiments. As shown, the filler 800 is optionally one of a plurality of fillers received between the crown connector module 20 and the enclosure 150 to produce a more finished aesthetic as desired.

Figure 41:
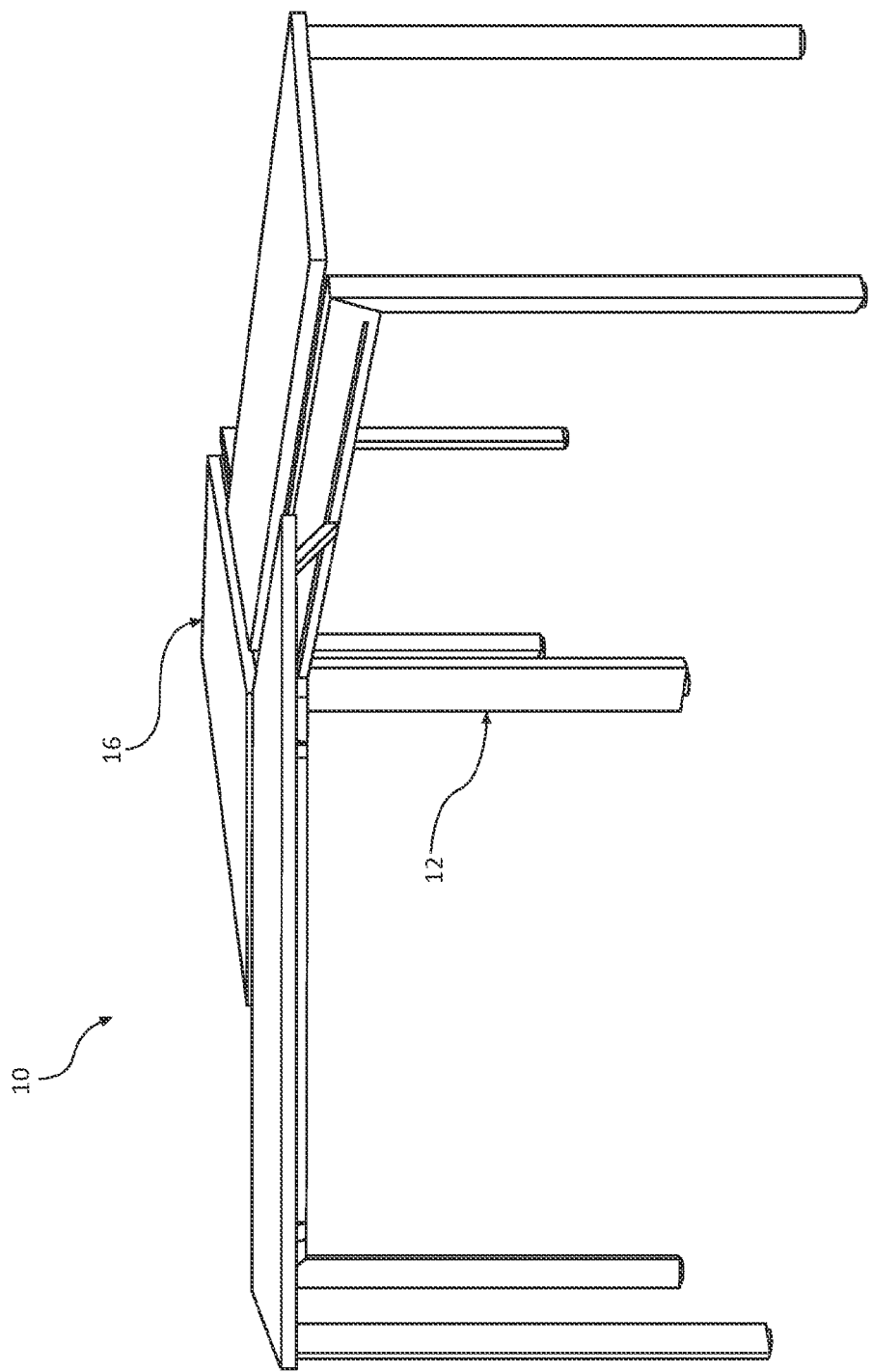
FIGS. 41 to 44 show configurations of the modular work system, according to some embodiments.

FIG. 41 is a perspective view of the modular work system 10, according to some embodiments. As shown, the modular work system 10 includes the connector hub assembly 12 positioned in a central location to provide electrical, communication (or data), or other connectivity to users of the workspace system 16. In some embodiments, the frame system includes electrical outlets that are fed by cabling passing through the connector hub assembly 12, as previously described (i.e., internal to or external to the frame system). As shown, the work system 10 is configured in a branched, or star-shaped set up that optionally enhances the collaborative nature, or feel of the work system 10.

Figure 42:
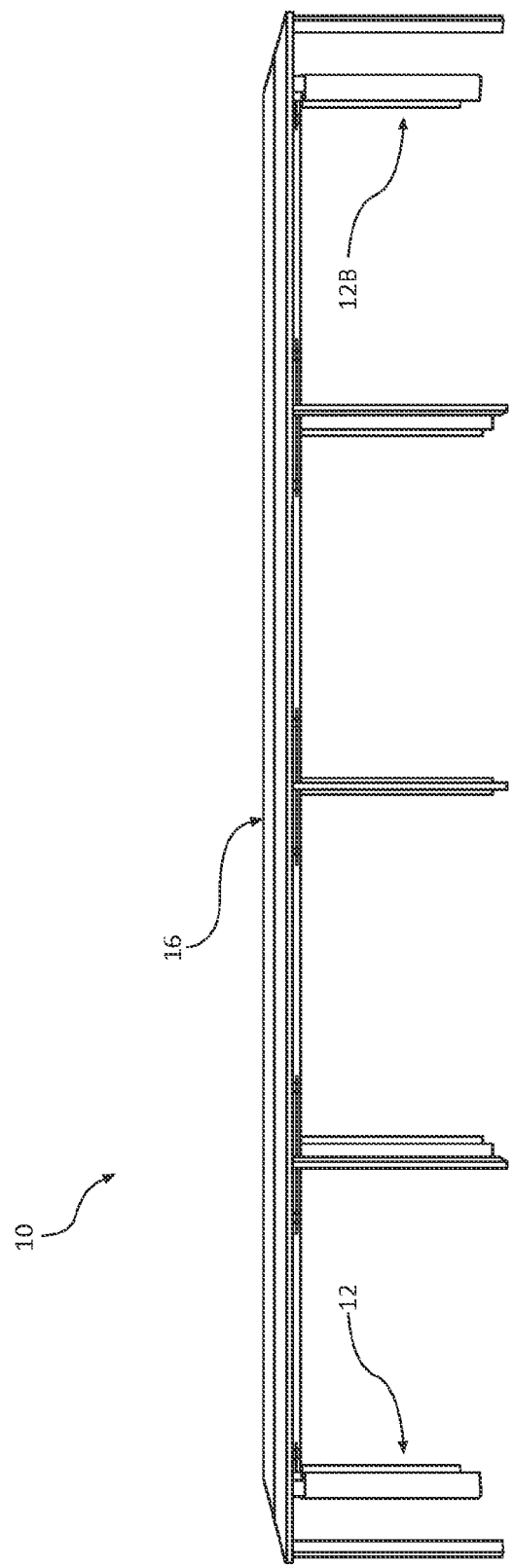

FIG. 42 is a perspective view of the modular work system 10, according to some embodiments. As shown, the modular work system 10 includes the connector hub assembly 12 positioned at one end of the module work system 10 with another connector hub assembly 12B that is substantially similar to the connector hub assembly 12 positioned at an opposite end of the work system 10. The connector hub assemblies 12, 12B optionally provide electrical, communication (or data), or other connectivity to users of the workspace system 16. In some embodiments, the frame system includes electrical outlets that are fed by cabling passing through the connector hub assembly 12, as previously described (i.e., internal to or external to the frame system). As shown, the work system 10 is configured in a more traditional, linear configuration.

Figure 43:
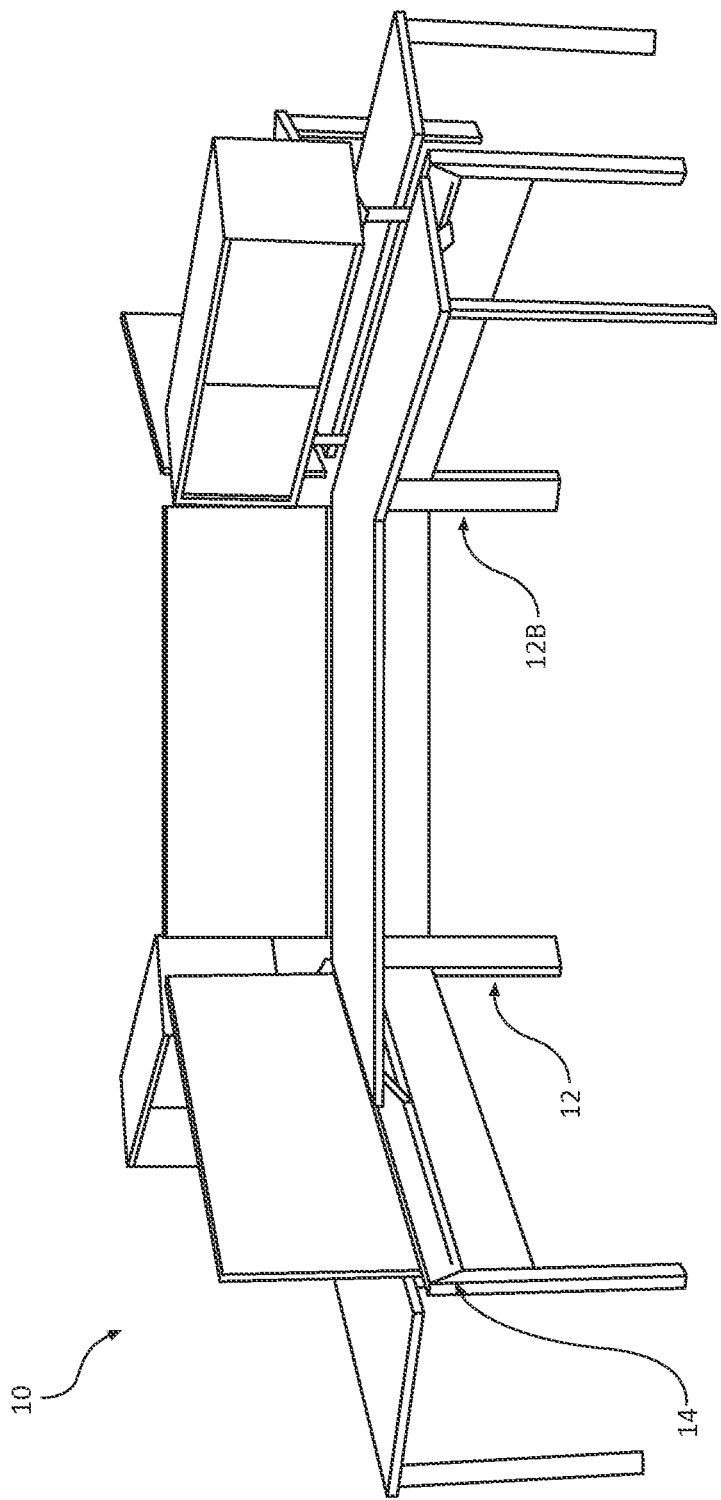
Figure 44:
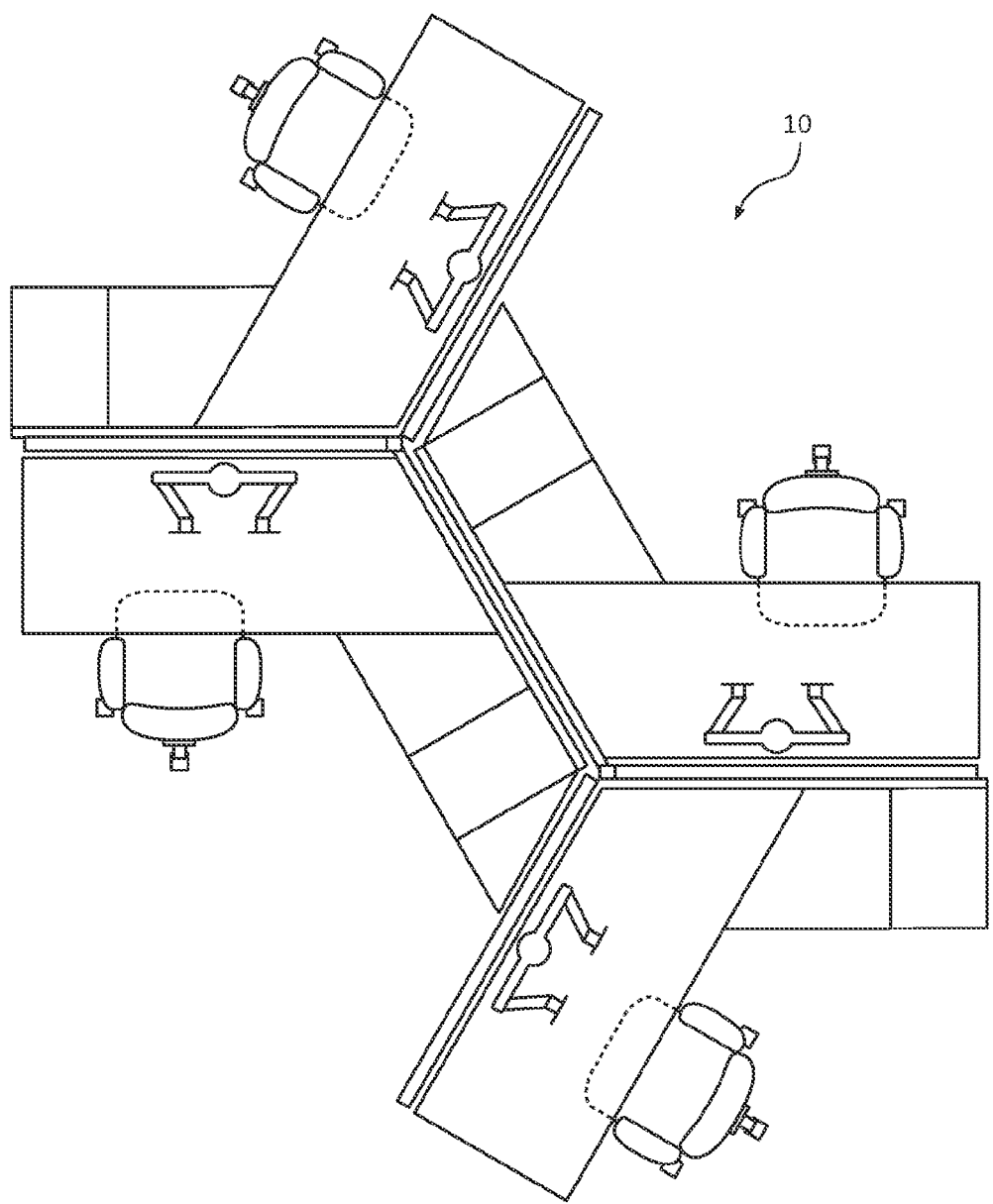

FIG. 43 is a perspective view of the modular work system 10 and FIG. 44 is a top view of the modular work system 10, according to some embodiments. As shown, the modular work system 10 includes the connector hub assembly 12 positioned at one central location of the module work system 10 with another connector hub assembly 12B that is substantially similar to the connector hub assembly 12 positioned at an opposite, central location of the work system 10. The connector hub assemblies 12, 12B optionally provide electrical, communication (or data), or other connectivity to users of the workspace system 16. In some embodiments, the frame system 14 includes electrical outlets that are fed by cabling passing through the connector hub assembly 12, as previously described (i.e., internal to or external to the frame system). As shown, the work system 10 is configured in a hybrid, linear and branched configuration.

Figure 45:
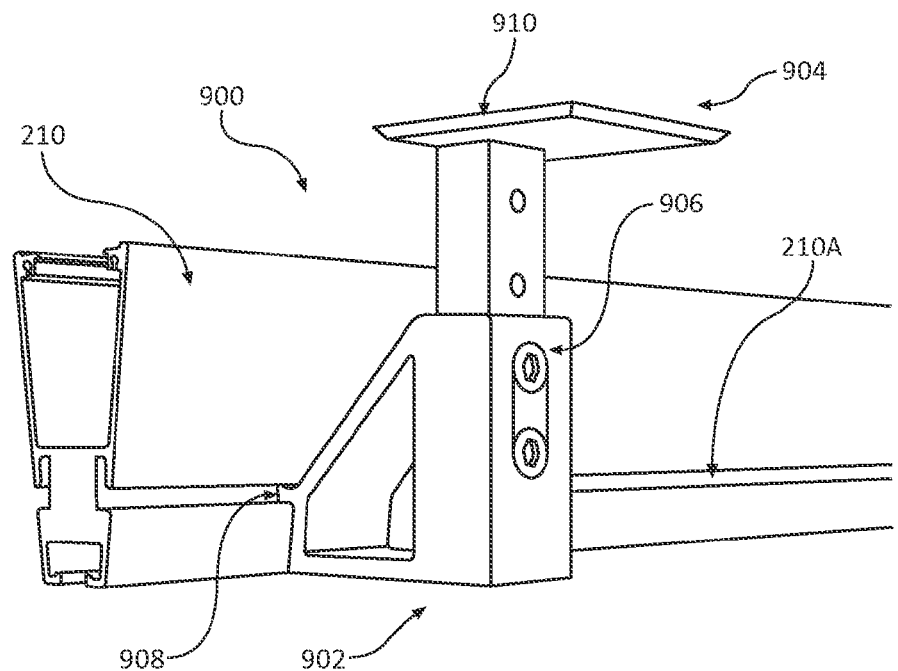
FIGS. 45 and 46 show configurations of an adjustable height bracket of the modular work system, according to some embodiments.
Figure 46:
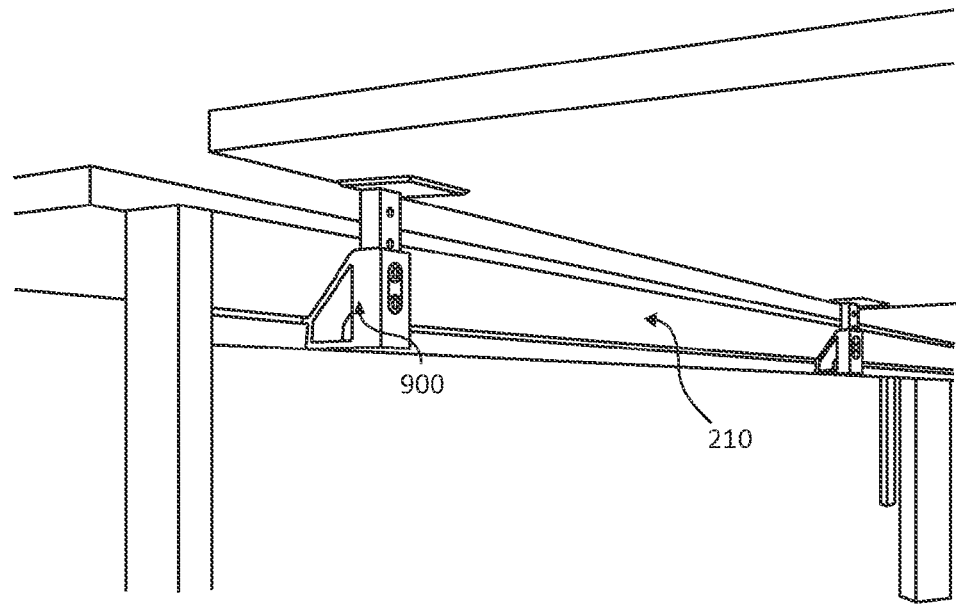

FIG. 45 is a perspective view of one of the frame member 210 of the frame system 14 and a height adjustable bracket 900, according to some embodiments. As shown, the frame member 210 includes a channel 210A for receiving one or more accessories, such as the height adjustable bracket 900. The height adjustable bracket 900 includes an attachment portion 902 and an extension portion 904, the extension portion 904 being telescopically received with the attachment portion 902. As shown, one or more fasteners 906 are employed to secure the extension portion 904 at a desired height relative to the attachment portion 902. In some embodiments, the attachment portion 902 includes a flange 908 (partially obscured in FIG. 45) that is inserted into the channel 210A to secure the height adjustable bracket 900 to the frame system 14. In some embodiments, the extension portion 902 includes an upper portion 910 that is configured to be attached to a work surface, such as a table. FIG. 46 illustrates the height adjustable bracket 900 secured to the frame member 210 supporting a work surface, according to some embodiments.

Figure 47:
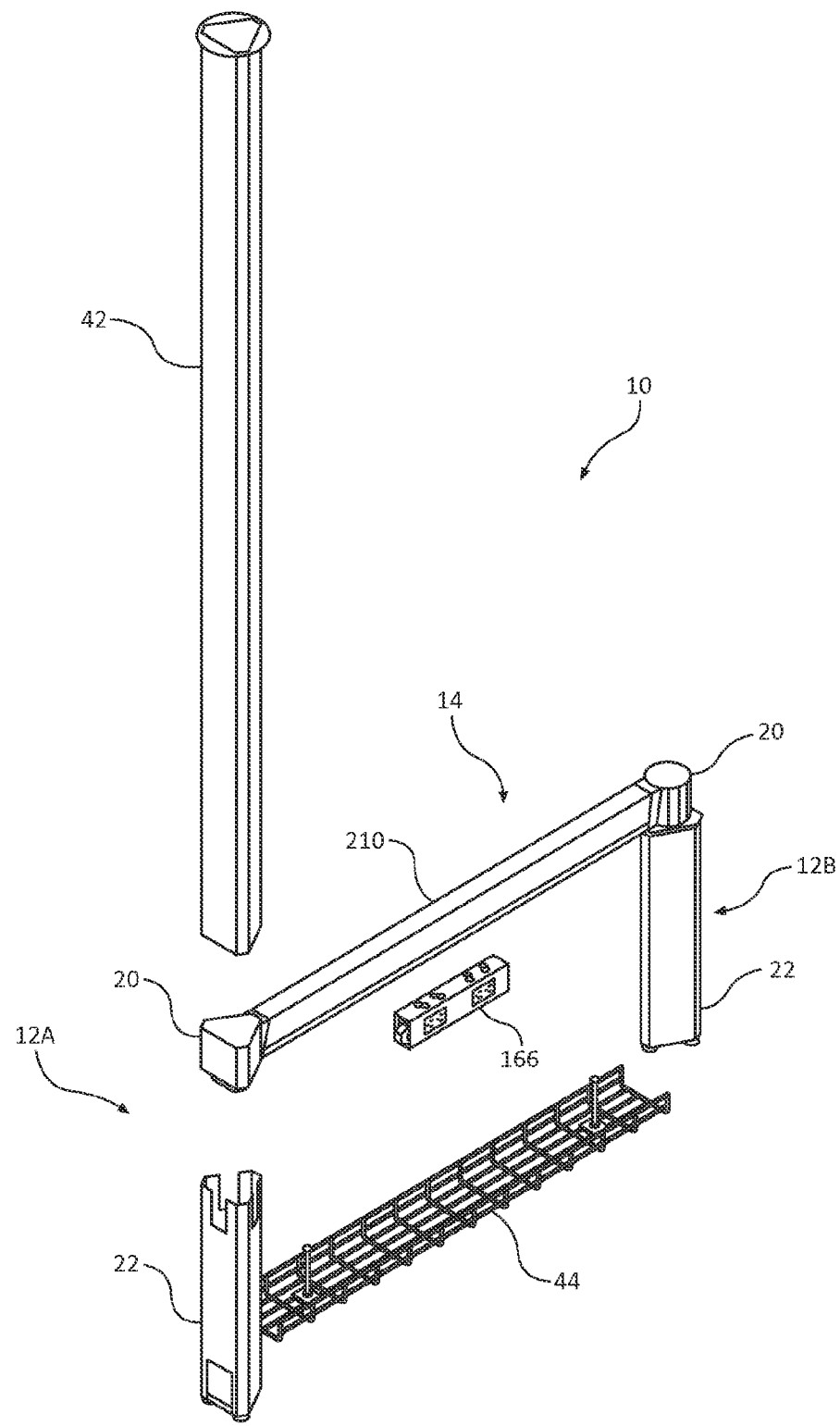
FIG. 47 is an exploded, or disassembled view of a modular work system detailed in FIGS. 48 to 53, according to some embodiments.

FIGS. 47 to 53 show a modular work system, such as modular work system 10 discussed above, according to some embodiments. FIG. 47 is an exploded view, or disassembled view of the modular work system detailed in FIGS. 48 to 53. As is illustrated in FIG. 47, in some embodiments, the modular work system includes one or more connector hub assemblies 12, such as connector hub assemblies 12A and 12B. In some embodiments, the modular work system 10 includes a frame system 14 secured to and extending between the connector hub assemblies 12A and 12B. Moreover, in some embodiments, the modular work system 10 includes an upper connection assembly 42, which extends between the connector hub assembly 12A and a ceiling of a workspace, such as an office space. In some embodiments, the upper connector hub 42 directly contacts the ceiling. In other embodiments, the upper connector hub extends between the connector hub assembly 12A and the ceiling without contacting the ceiling. As discussed in greater detail below, in various embodiments, the modular work system 10 includes various additional components and accessories, such as data components and accessories, electrical components and accessories, and routing accessories.

As discussed above, connector hub assembly 12 includes a connector module 20 and a body assembly 22 supporting the connector module 20 in an upright position, for example on a building floor. In various embodiments, as discussed below, connector module 20 is configured to interface with upper connection assembly 42. Moreover, in various embodiments (as discussed in more detail above), connector module 20 is configured to interface with one or more frame members, such as frame member 210 (See FIGS. 1, 2, 11, 13, 14, 30, and 48 to 53). In various embodiments, body assembly 22 is coupled to connector module 20 (see FIGS. 3-7, 10, 23 to 30, 47 to 53).

As discussed above, in various embodiments, the upper connector assembly 42 extends between the connector hub assembly 12A and a ceiling of a workspace. In some embodiments, the upper connector assembly 42 extends between the connector hub assembly 12A and the ceiling of the workspace such that one or more power supply cables (e.g., power supply cable 200, discussed above) and one or more data supply cables can be routed to the modular work system 10. Specifically, in various embodiments, the upper connector assembly 42 is configured to couple to connector module 20 of connector hub assembly 12. Thus, while connector module 20 is configured to interface with various components of the modular work system 10 according to the embodiments discussed herein, in various embodiments, the connector module 20 is additionally configured to interface and couple with the upper connector assembly 42. Such a configuration provides for the easy and efficient routing of power and data cabling through an office space and to a modular work system.

For example, as is illustrated in FIGS. 48 to 53, the upper connector assembly 42 and connector hub assembly 12, together, facilitate the routing of one or more power transfer cables 202 and one or more data cables 220 to the modular work system 10. In some embodiments, a power supply cable 200 (not pictured) is routed through a ceiling of a workspace, through the upper connector assembly 42, and into the connector hub assembly 12, such as connector hub assembly 12A. In some embodiments, a power transfer cable, such as the power transfer cable 202 illustrated in FIG. 48, delivers power to one or more electrical accessories 166.

In some embodiments, the upper connector assembly 42 shares a similar construction to that of base assembly 22. Specifically, upper connector assembly 42 includes an enclosure 224 and a body cover 226 (similar to enclosure 150 and body cover 156). In some embodiments, the enclosure 224 and body cover 226 create a hollow interior (not illustrated) through with power and data cabling can be routed. As is illustrated in FIG. 48, and as discussed in greater detail below, power and data cabling are routed through upper connector assembly 42, through connector module 20, through a portion of base assembly 22, and out of base assembly 22.

While certain of the embodiments discussed above provide for routing power and data cabling through the frame system 14 of the modular work system 10, in various alternative embodiments, power and data cabling may be routed external to the frame system 14 of the modular work system 10. Specifically, in some embodiments, connector hub assembly 12A, and specifically, base assembly 22, includes one or more ports or openings 179. These openings 179 facilitate the routing of power transfer cable 202 and/or data cable 220 along a routing path which extends external to frame system 14 of the modular work system 10. It should be appreciated that power transfer cable 202 and/or data cable 220 may be routed in any suitable external configuration, including but not limited to: above, below, in front of, and/or behind one or more frame members 210 of frame system 14. In other words, power transfer cable 202 and/or data cable 220 may be routed external to frame system 14 in any suitable manner without departing from the scope of the present application. Moreover, while the above-discussed embodiment illustrates the power and data cabling exiting the connector hub assembly 12A through an opening in base assembly 22, in various other embodiments, the power and/or data cabling may exit the connector hub assembly 12A through the connector module 20 or may alternatively exit the upper connector assembly 42 prior to being routed into the connector hub assembly.

Figure 48:
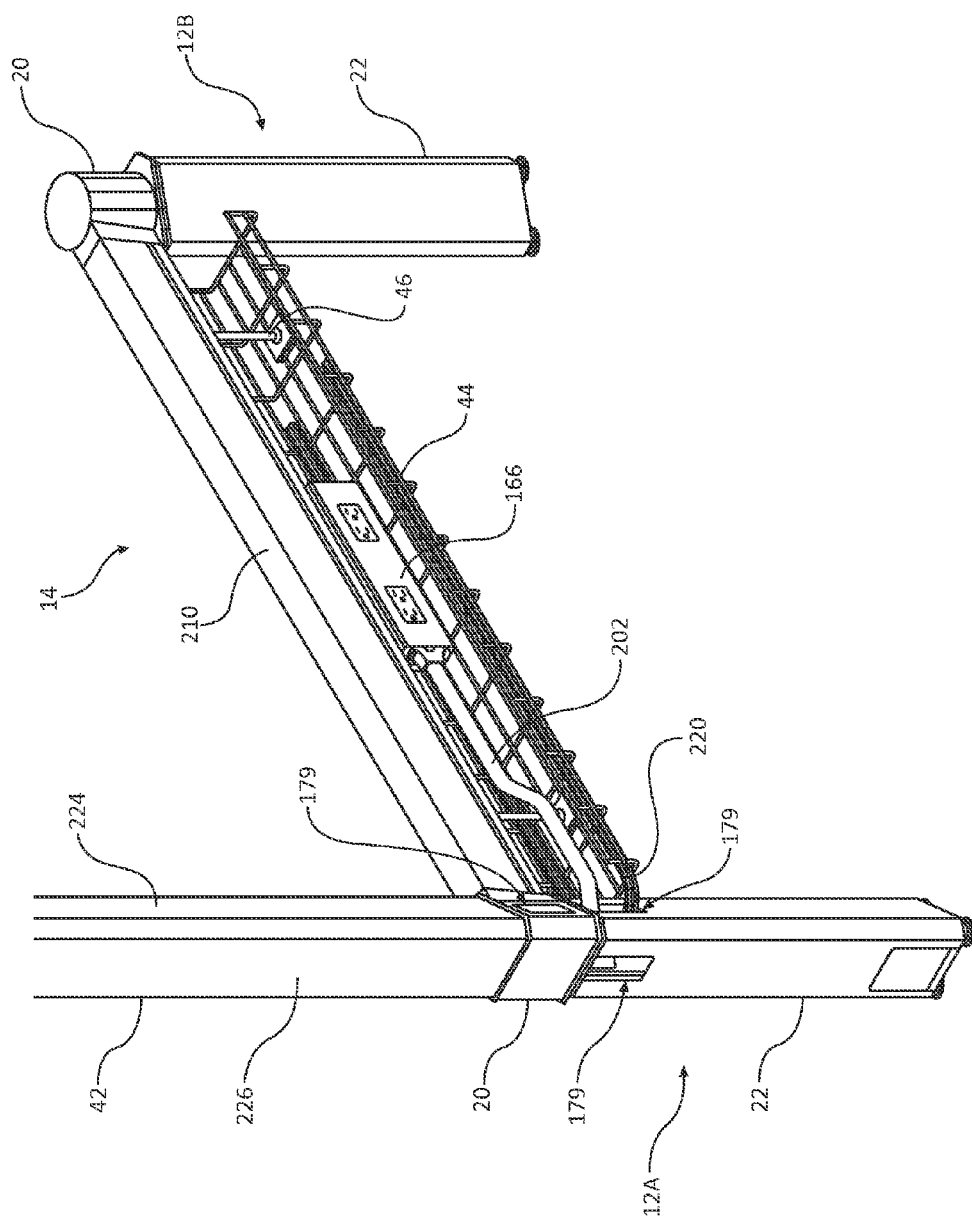
FIGS. 48 and 49 are perspective views of the modular work system of FIG. 47.
Figure 49:
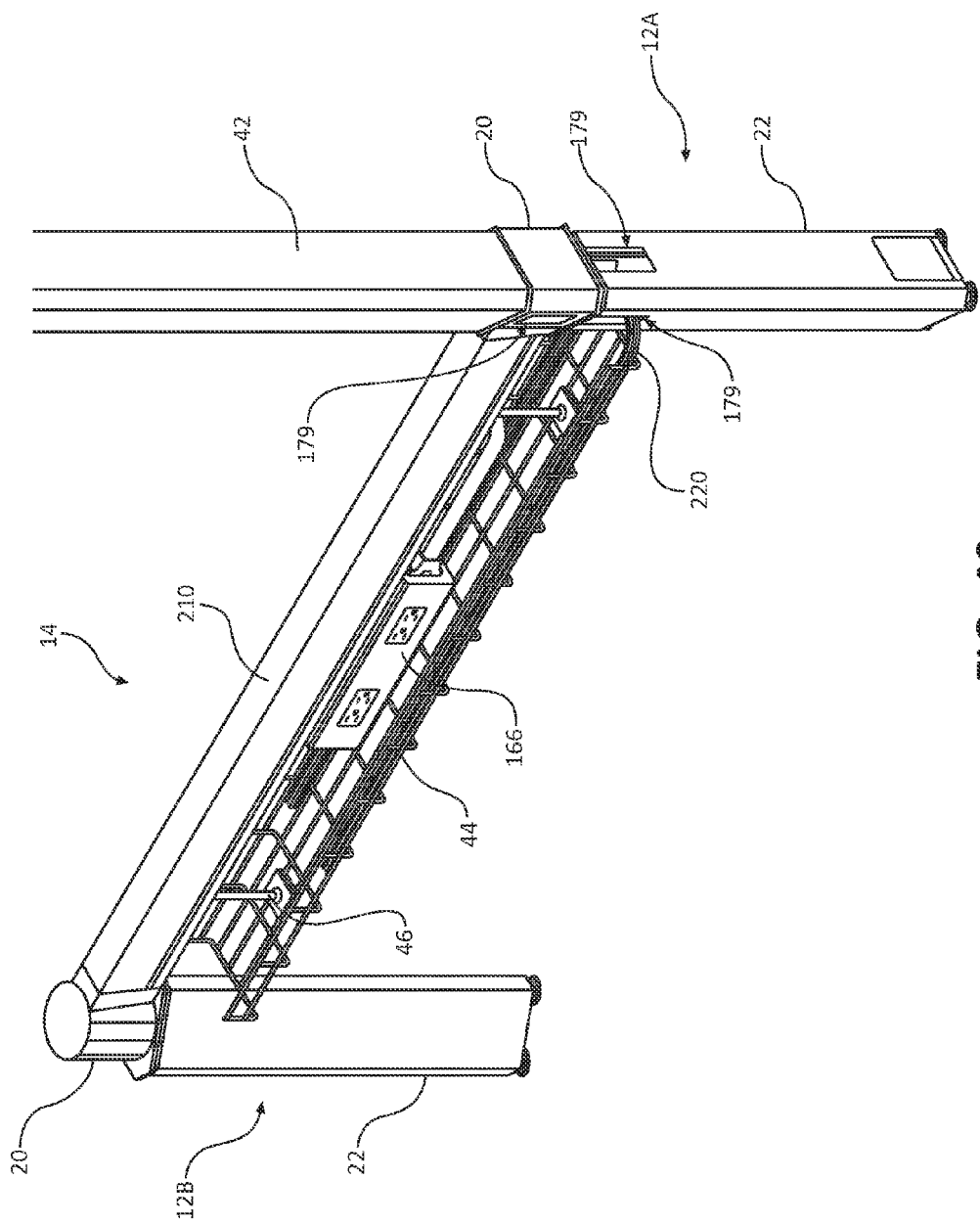
Figure 52:
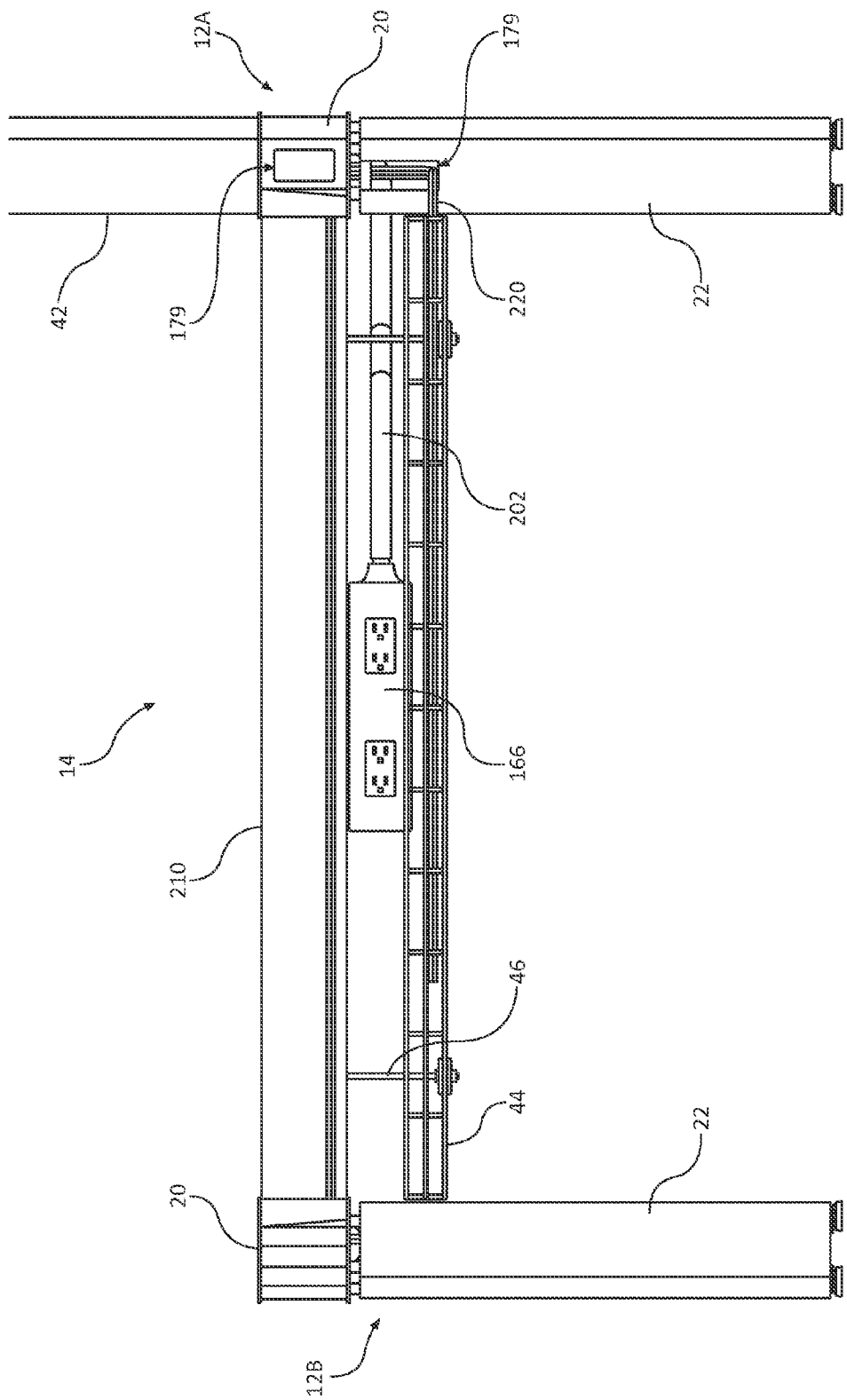
FIGS. 52 and 53 are side views of the modular work system of FIG. 47.
Figure 53:
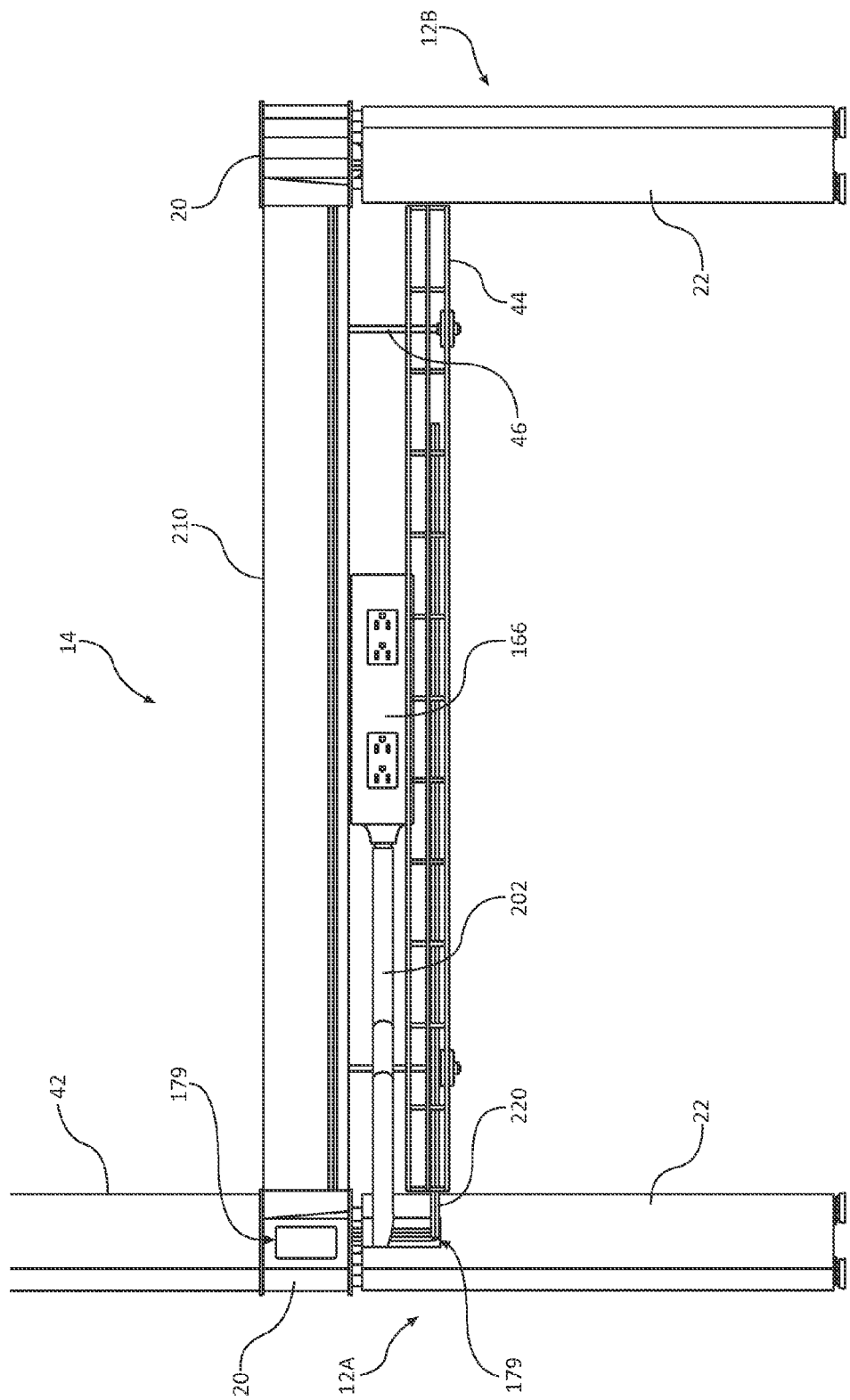

As discussed above, in various embodiments, power transfer cable 202 delivers power to one or more power accessories, such as power accessory 166 illustrated in FIG. 48. Similarly, data cable 220 connects of one or more data accessories (not pictured) such that data may be transferred to and from one or more devices located at the modular work station 10, along data cable 220. In some embodiments, power and data accessories are incorporated into frame system 14. In various other embodiments, power and data accessories are positioned external to the frame system 14. By providing an external configuration of data and power cabling and data and power accessories, the modular work system can be easily and efficiently installed, modified, and/or relocated.

In various embodiments, as discussed above, the modular work system 10 includes one or more routing accessories. For example, as is illustrated in FIGS. 47 to 53, the modular work system 10 includes a cable management routing accessory 44. In some embodiments, the cable management routing accessory 44 is suspended below one or more frame members 210 of the frame system 14. In various embodiments, the cable management routing accessory 44 facilitates an organized and efficient routing of data and/or power cabling to one or more data and/or power accessories (such as power accessory 166). In some embodiments, the cable management routing accessory 44 is coupled to one or more frame members 210 via one or more frame couplers 46. In various embodiments, frame couplers 46 provide for adjustment of the cable management routing accessory 44 to a desired position relative to the frame member 210. While the cable management routing accessory illustrated in FIGS. 48 to 53 is suspended below frame member 210, it should be appreciated that cable management routing accessory 44 may be positioned in any suitable configuration, including but not limited to: above, below, in front of, and/or behind frame member 210. Moreover, cable management routing accessory 44 may be coupled to any suitable member or component of the modular work system 10, such as connector hub assemblies 12.

It should be appreciated that each of the various components discussed herein are configured to operate in accordance with one another. Moreover, the various configurations disclosed herein are intended to be interchangeable and compatible, such that a given modular work system configuration may employ any combination of and any number of the various components and configurations (including internal and external routing of cabling) discussed herein. Put differently, certain components and a particular configuration may be employed for one portion of a modular work system while various other components and another configuration may be employed for another portion of the modular work system.

From the foregoing it should be readily apparent that the connector hub assembly 12 is optionally employed in a variety of uses and work system 10 set ups to provide flexibility in utilization of the space in which the system 10 is to be installed, as well as flexibility in enhancing work flow and feel for users of the system 10. According to various embodiments, the connector hub assembly 12 is able to be utilized as a standalone module or as part of a larger system with one or more connector hub assemblies similar to the connector hub assembly 12. In some methods of providing the system 10, a user is able to select a desired configuration for the system (e.g., from an on-line catalog or other source) and is provided associated instructions including the necessary components for accomplishing the desired configuration and instructions for assembly of the components. In some embodiments, multiple configurations are identified to a potential purchaser or other user of the system 10 from a pre-defined set of components.

Various modifications and additions can be made to the embodiments discussed without departing from the scope of invention. For example, while the embodiments described above refer to particular features, the scope of invention includes embodiments having different combinations of features and embodiments that do not include all of the above described features.

The following is claimed:

1. A modular work system comprising:
   a connector hub assembly including,
      a crown connector module including,
         a top cover,
         a crown base including a support hub extending from an upper surface of the crown base, the support hub including a plurality of slots,
         a first connector including an attachment flange, the attachment flange adapted to be secured to the crown based such that the first connector extends above the crown base and the support hub, a portion of the top cover situated atop the first connector,
         a plurality of individually removable gap members, each adapted to be received by the top cover and the support hub of the crown base such that the each gap member extends above the crown base and the support hub, a portion of the top cover situated atop the first gap member, and
      a body assembly adapted to rest on a floor such that the body assembly is supported in an upright position; and
   a frame member forming an elongate body having a first end adapted to be secured to the first connector of the connector hub assembly.

2. The modular work system of claim 1, wherein the top cover includes a support flange having a plurality of slots.

3. The modular work system of claim 2, wherein each gap member includes a perimeter wall and a channel insert, the perimeter wall and the channel insert adapted to be received in one of the plurality of slots of the top cover and one of the plurality of slots of the support hub of the crown base.

4. The modular work system of claim 2, wherein each of the plurality of slots of the support flange is spaced from an adjacent one of the plurality of slots of the support flange at a regular angular offset and further wherein each of the plurality of slots of support hub is spaced from an adjacent one of the plurality of slots of the support hub at the regular angular offset.

5. The modular work system of claim 2, wherein the plurality of gap members are substantially similar, each of the plurality of gap members being adapted to be received in a corresponding pair of the plurality of slots of the support flange and the support hub.

6. The modular work system of claim 1, wherein the first connector defines a feed channel and a mounting face, the frame member being secured to the mounting face of the first connector.

7. The modular work system of claim 6, further comprising a connector cover adapted to be secured to the first connector over the feed channel.

8. The modular work system of claim 1, wherein the connector hub assembly further comprises a crown mounting bracket adapted to be secured to the crown base and to the body assembly.

9. The modular work system of claim 1, wherein the body assembly further comprises an enclosure including a wall defining an interior space, an accessory mount adapted to be housed within the enclosure, and a body cover adapted to be secured to the enclosure.

10. The modular work system of claim 9, wherein the body assembly further comprises a bottom support, the bottom support being adapted to be secured to the enclosure such that the enclosure is supported in an upright position.

11. The modular work system of claim 1, wherein the top cover and the support hub of the crown base each define a substantially circular profile.

12. The modular work system of claim 1, further comprising a plurality of connectors substantially similar to the first connector, each of the plurality of connectors being positioned about the crown base and spaced circumferentially from an adjacent one of the plurality connectors by an angle of at least 30 degrees.

13. The modular work system of claim 1, wherein the attachment flange of the first connector is secured to the crown base.

14. A method of assembling a modular work system, the method comprising:
assembling a crown connector module, assembly of the connector module comprising the steps of:
securing a first connector onto a crown base, the crown base including a support hub extending from an upper surface of the crown base, the support hub including a plurality of slots, the first connector extending above the crown base and the support hub;
assembling a plurality of individually removable gap members onto the crown base such that each gap member is received by the support hub of the crown base and such that each gap member extends above the crown base and the support hub, and assembling a top cover onto the first connector and onto each gap member such that each gap member is received by the top cover, the top cover being situated atop the plurality of gap members and the first connector;
securing the crown connector module onto a body module, the body module configured to rest on a floor such that the assembled crown connector module and the body module are supported in an upright position; and
securing a first end of an elongate frame member onto the first connector of the crown connector module.

15. A crown connector module comprising:
a crown base including a support hub extending from an upper surface of the crown base, the support hub having a plurality of slots,
a top cover including a support flange having a plurality of slots,
a first connector including an attachment flange, the attachment flange adapted to be secured to the crown based such that the first connector extends above the crown base and the support hub, a portion of the top cover being situated atop the first connector, and
a plurality of individually removable gap members, each including a channel insert and each being adapted to be received by any one of the plurality of slots of the top cover and by any one of the plurality of slots of the support hub of the crown base such that each gap member extends above the crown base and the support hub, a portion of the top cover being situated atop the first gap member.

16. The crown connector module of claim 15, wherein each of the plurality of slots of the support flange is spaced from an adjacent one of the plurality of slots of the support flange at a regular angular offset and further wherein each of the plurality of slots of the support hub is spaced from an adjacent one of the plurality of slots of the support hub at the regular angular offset.

17. The crown connector module of claim 15, wherein the plurality of gap members are substantially similar, each of the plurality of gap members being adapted to be received in a corresponding pair of the plurality of slots of the support flange and the support hub.

18. The crown connector module of claim 15, wherein the first connector further includes a conduit feed channel and a mounting face.

19. The crown connector module of claim 18, further comprising a connector cover adapted to be secured to the first connector over the feed channel.

20. The crown connector module of claim 15, wherein the top cover and the support hub of the crown base each define a substantially circular profile.

21. The crown connector module of claim 15, further comprising a plurality of connectors substantially similar to the first connector, each of the plurality of connectors being positioned about the crown base and spaced circumferentially from an adjacent one of the plurality connectors by an angle of at least 30 degrees.

* * * * *